(12) United States Patent
Hu et al.

(10) Patent No.: US 11,727,639 B2
(45) Date of Patent: Aug. 15, 2023

(54) SHAPE REFINEMENT OF THREE-DIMENSIONAL (3D) MESH RECONSTRUCTED FROM IMAGES

(71) Applicant: SONY GROUP CORPORATION, Tokyo (JP)

(72) Inventors: Jie Hu, San Jose, CA (US); Mohammad Gharavi-Alkhansari, San Jose, CA (US)

(73) Assignee: SONY GROUP CORPORATION, Tokyo (JP)

( * ) Notice: Subject to any disclaimer, the term of this patent is extended or adjusted under 35 U.S.C. 154(b) by 54 days.

(21) Appl. No.: 17/408,928

(22) Filed: Aug. 23, 2021

(65) Prior Publication Data

US 2023/0056800 A1    Feb. 23, 2023

(51) Int. Cl.
*G06T 17/20*    (2006.01)
*G06T 19/20*    (2011.01)
*G06T 5/00*    (2006.01)
*G06T 15/50*    (2011.01)
*G06T 5/30*    (2006.01)

(52) U.S. Cl.
CPC ............ *G06T 17/205* (2013.01); *G06T 5/002* (2013.01); *G06T 5/30* (2013.01); *G06T 15/503* (2013.01); *G06T 19/20* (2013.01); *G06T 2207/20192* (2013.01); *G06T 2207/30196* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 10,559,111 B2* | 2/2020 | Sachs | G06F 3/005 |
| 11,042,146 B2* | 6/2021 | Link | G06T 7/001 |
| 2005/0063582 A1* | 3/2005 | Park | G06T 17/10 |
| | | | 382/181 |
| 2013/0307848 A1* | 11/2013 | Tena | G06T 17/205 |
| | | | 345/420 |
| 2016/0005227 A1 | 1/2016 | Schmidt | |

(Continued)

OTHER PUBLICATIONS

Blanz, Volker, and Thomas Vetter. "A morphable model for the synthesis of 3D faces." Proceedings of the 26th annual conference on Computer graphics and interactive techniques. 1999. (Year: 1999).*

(Continued)

*Primary Examiner* — Ryan M Gray
(74) *Attorney, Agent, or Firm* — Chip Law Group

(57) ABSTRACT

An electronic device and method for shape refinement of a 3D mesh reconstructed from images is disclosed. A set of images of an object is acquired and used to estimate a first 3D mesh of a head portion of the object. A first set of operations is executed on the first 3D mesh to generate a second 3D mesh. The first set of operations includes a removal of one or more regions which are unneeded for head-shape estimation and/or a removal of one or more mesh artifacts associated with a 3D shape or a topology of the first 3D mesh. A 3D template mesh is processed to determine a set of filling patches which corresponds to a set of holes in the second 3D mesh. Based on the second 3D mesh and the set of filling patches, a hole filling operation is executed to generate a final 3D mesh.

20 Claims, 23 Drawing Sheets

(56) References Cited

U.S. PATENT DOCUMENTS

| | | | |
|---|---|---|---|
| 2017/0024907 A1* | 1/2017 | Bermano | G06T 17/20 |
| 2017/0344807 A1* | 11/2017 | Jillela | G06V 40/166 |
| 2017/0372505 A1 | 12/2017 | Bhat et al. | |
| 2018/0067197 A1* | 3/2018 | Schockaert | G06T 5/002 |
| 2018/0174348 A1* | 6/2018 | Bhat | G06T 19/20 |
| 2018/0218507 A1* | 8/2018 | Hyllus | G06V 20/653 |
| 2019/0122411 A1* | 4/2019 | Sachs | G06T 7/73 |
| 2022/0222897 A1* | 7/2022 | Yang | G06T 7/50 |

OTHER PUBLICATIONS

Rodrigues, Marcos, and Alan Robinson. "Novel methods for real-time 3D facial recognition." (2010): 169-180. (Year: 2010).*

Attene, Marco, Marcel Campen, and Leif Kobbelt. "Polygon mesh repairing: An application perspective." ACM Computing Surveys (CSUR) 45.2 (2013): 1-33. (Year: 2013).*

Schonberger, et al., "Structure-from-Motion Revisited", Conference on Computer Vision and Pattern Recognition (CVPR), IEEE, Jun. 27-30, 2016, pp. 4104-4113.

Schonberger, et al., "Pixelwise View Selection for Unstructured Multi-View Stereo", European Conference on Computer Vision (ECCV), Sep. 17, 2016, pp. 501-518.

Sumner, et al., "Deformation Transfer for Triangle Meshes", ACM Transactions on Graphics, vol. 23, No. 3, Aug. 2004, pp. 399-405.

Sheffer, et al., "Pyramid Coordinates for Morphing and Deformation", Proceedings of the 2nd International Symposium on 3D Data Processing, Visualization, and Transmission (3DPVT'04), Sep. 9, 2004, 08 pages.

Jakob, et al., "Instant field-aligned meshes", ACM Transactions on Graphics, vol. 34, No. 6, Oct. 26, 2015, 15 pages.

Ngo, et al., "Feature-First Hole Filling Strategy for 3D Meshes", International Conference on Computer Vision, Imaging and Computer Graphics, Jan. 2013, pp. 53-68.

* cited by examiner

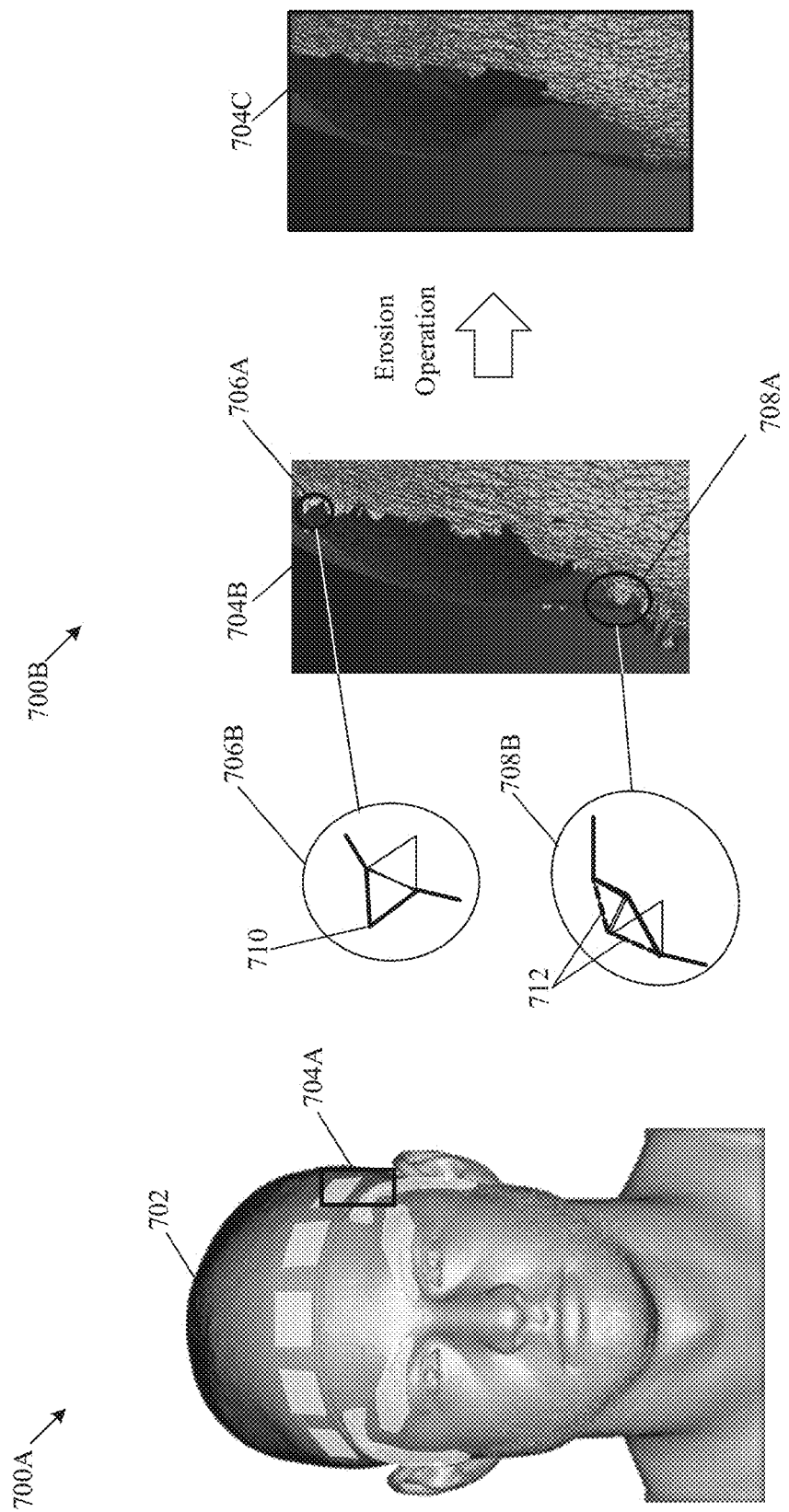

SHAPE REFINEMENT OF THREE-DIMENSIONAL (3D) MESH RECONSTRUCTED FROM IMAGES

CROSS-REFERENCE TO RELATED APPLICATIONS/INCORPORATION BY REFERENCE

None

FIELD

Various embodiments of the disclosure relate to three-dimensional (3D) modeling and virtual human modelling. More specifically, various embodiments of the disclosure relate to an electronic device and method for shape refinement of a three-dimensional (3D) mesh reconstructed from images.

BACKGROUND

Advancements in the field of three-dimensional (3D) computer graphics have provided the ability to create 3D models and visualize real objects in a 3D computer graphics environment. 3D content, such as a 3D character model, is increasingly used in animated movies, games, and virtual-reality systems to enhance user experience. A 3D model is a static 3D mesh that resembles the shape of a particular object. Typically, such a 3D model is manually designed by computer graphics artists, commonly known as modelers, by use of a modeling software application.

Creating a realistic model that represents the 3D shape of the object has been a difficult problem in field of computer graphics and computer vision. With increasing applications in areas of virtual reality, 3D human avatar, 3D gaming, and virtual simulation, generating an accurate 3D mesh and imparting photorealism to the associated 3D model has become increasingly important. To impart realism to a 3D model of an object, a 3D mesh corresponding to the 3D model may be required to be refined. Traditionally, the 3D mesh may be manually refined to remove artifacts or other defects from the 3D mesh. However, manual refinement of the 3D mesh may require significant amount of time and effort and may be prone to errors.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for shape refinement of a three-dimensional (3D) mesh reconstructed from images is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 7A and 7B are diagrams that illustrate refinement of a boundary associated with each of a set of holes in a second 3D mesh, in accordance with an embodiment of the disclosure.

DETAILED DESCRIPTION

Figure 1:
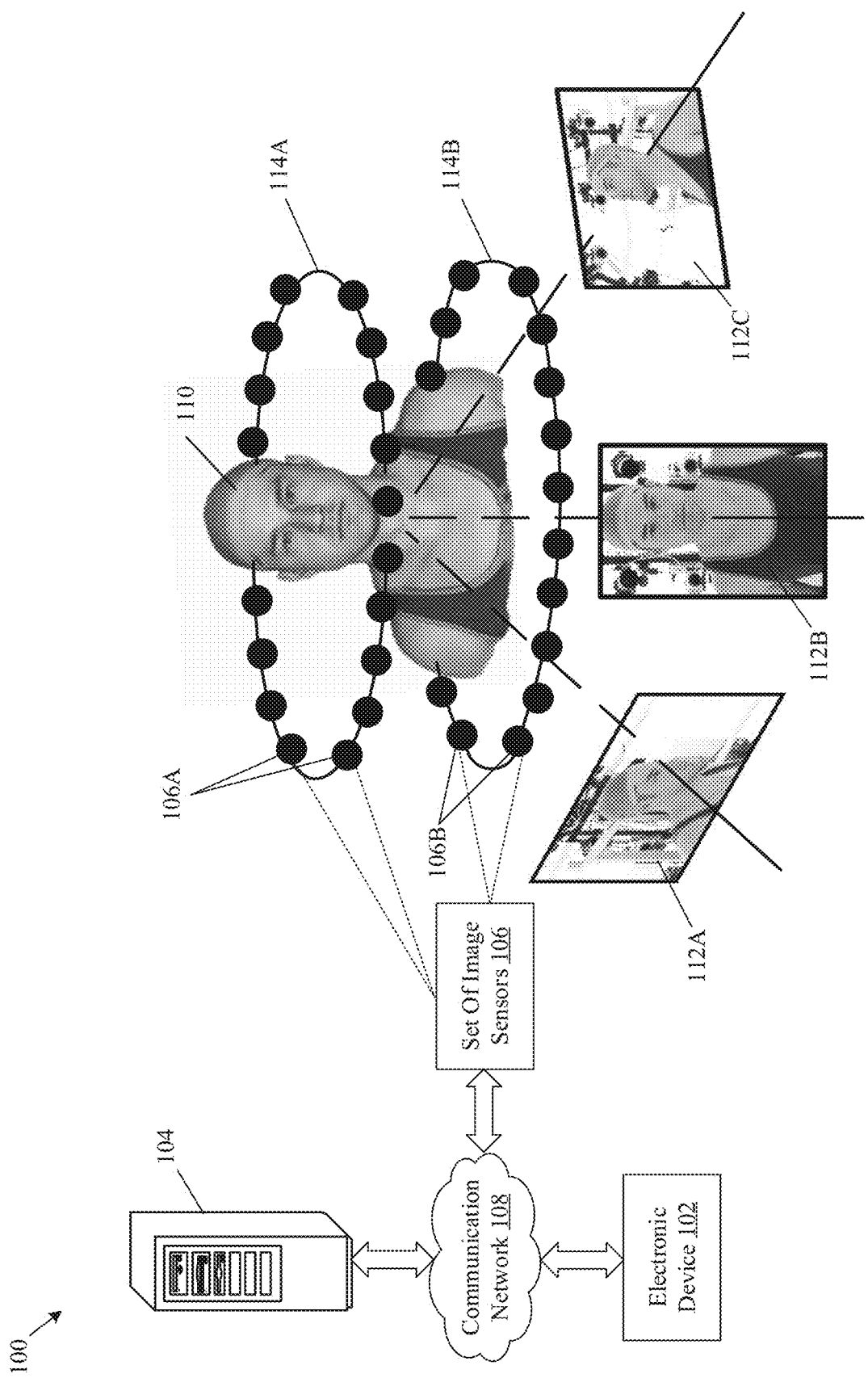
FIG. 1 is a block diagram that illustrates an exemplary network environment for shape refinement of a three-dimensional (3D) mesh reconstructed from images, in accordance with an embodiment of the disclosure.

The following described implementations may be found in the disclosed electronic device and method for shape refinement of a three-dimensional (3D) mesh reconstructed from images. Exemplary aspects of the disclosure may include an electronic device and a method to acquire a set of images of an object. For example, a set of image sensors may be associated with the electronic device. The set of image sensors may capture the set of images of the object from a corresponding set of viewpoints associated with the object. The electronic device may acquire the set of images captured by the set of image sensors. The object may be, for example, an animate object (such as, a human subject) or an inanimate object (such as, a statue or a portrait of a human subject). A first 3D mesh of a head portion of the object may be estimated based on the acquired set of images. For example, the estimation of the first 3D mesh may be based on the acquired set of images, using a photogrammetric reconstruction method.

A first set of operations may be executed on the first 3D mesh to generate a second 3D mesh. The first set of operations may include one or more of a removal of one or more unneeded regions or a removal of one or more mesh artifacts. The one or more unneeded regions may be unneeded for head-shape estimation of a head portion of the object. The one or more mesh artifacts may be associated with a 3D shape or a topology of the first 3D mesh. Based on the execution of the first set of operations on the first 3D mesh, the generated second 3D mesh may include a set of holes corresponding to the removed one or more unneeded region and/or the removed one or more mesh artifacts. A 3D template mesh may be processed to determine a set of filling patches corresponding to the set of holes in the generated second 3D mesh. Based on the generated second 3D mesh and the determined set of filling patches, a hole filling operation may be executed to generate a final 3D mesh.

In conventional methods, a 3D mesh that may represent a 3D shape of an object may be manually refined. A computer graphics artist, designer, modeler, or expert (hereinafter referred as a human modeler) may manually select regions in the 3D mesh that may not be required. The human modeler may also manually select and remove artifacts and other defects from the 3D mesh. The human modeler may refine the 3D mesh by manual selection of vertices of the 3D mesh and update of locations of the selected vertices in the 3D mesh. However, manual refinement of the 3D mesh may require significant amount of time and effort and may be prone to errors. In contrast, the present disclosure may provide a new method for automated shape refinement of a 3D mesh reconstructed from images of an object. The final 3D mesh may represent the 3D shape of the object with a higher accuracy and with improved quality as compared with that from the conventional methods. As the final 3D mesh may be generated automatically, manual effort and time may also be saved, as compared to conventional methods.

FIG. 1 is a block diagram that illustrates an exemplary network environment for shape refinement of a three-dimensional (3D) mesh reconstructed from images, in accordance with an embodiment of the disclosure. With reference to FIG. 1, there is shown a network environment 100. The network environment 100 may include an electronic device 102, a server 104, a set of image sensors 106, and a communication network 108. For example, the set of image sensors 106 may include a first image sensor 106A and a second image sensor 106B. In FIG. 1, there is further shown an object 110 that may be scanned by the set of image sensors 106. The electronic device 102 may be communicatively coupled to the server 104 and the set of image sensors 106, via the communication network 108.

In FIG. 1, the two image sensors 106A and 106B are presented merely as an example and should not be construed as limiting the disclosure. The set of image sensors 106 may include one or more than two image sensors, without a deviation from the scope of the disclosure. Also, the position, orientation and/or arrangement of the image sensors 106A and 106B, as shown in FIG. 1, are presented merely as an example and should not be construed as limiting the disclosure. The present disclosure may be applicable to other positions, orientations, and/or arrangements of the image sensors 106A and 106B, without a deviation from the scope of the disclosure.

In FIG. 1, the server 104 and the set of image sensors 106 are shown as two entities which are separate from the electronic device 102. In some embodiments, some or all of the functionalities of the server 104 and/or the set of image sensors 106 may be incorporated in the electronic device 102, without a deviation from the scope of the present disclosure.

The electronic device 102 may include suitable logic, circuitry, interfaces, and/or code that may be configured to generate a 3D mesh of a head portion of the object 110 from a set of images of the object 110. The generated 3D mesh may represent a 3D shape of the head portion of the object 110. The object 110 may be an animate object (such as a human subject or an animal) or an inanimate object (such as a statue or a portrait of a human subject). Examples of the electronic device 102 may include, but are not limited to, a computing device, a video-conferencing system, a virtual reality-based device, an augmented reality-based device, a gaming device, a mainframe machine, a server, a computer work-station, and/or a consumer electronic (CE) device.

The server 104 may include suitable circuitry, interfaces, and/or code that may be configured to store a 3D template mesh that may be a template head mesh of an object (such as a person, an animal, or a statue/portrait of a human subject or an animal). The 3D template mesh may represent a 3D topology or shape of an average head portion or facial region of the object 110 and may be designed based on inputs from a human modeler. The server 104 may be configured to receive a request for the stored 3D template mesh from the electronic device 102. The server 104 may transmit the stored 3D template mesh to the electronic device 102, in response to such request received from the electronic device 102. Examples of the server 104 may include, but are not limited to, an application server, a cloud server, a web server, a database server, a file server, a gaming server, a mainframe server, or a combination thereof.

The set of image sensors 106 may include suitable logic, circuitry, interfaces, and/or code that may be configured to capture a set of images of the object 110 from a set of viewpoints. For example, the set of image sensors 106 may include a first group of image sensors 106A at a first vertical level 114A surrounding the object 110. The set of image sensors 106 may further include a second group of image sensors 106B at a second vertical level 114B surrounding the object 110. The first group of image sensors 106A may capture a first group of images of the object 110 from a first group of viewpoints, simultaneously. Similarly, the second group of image sensors 106B may capture a second group of images of the object 110 from a second group of viewpoints, simultaneously. In an embodiment, the object 110 may be stationary while the first group of images and/or the second group of images may be captured. In another embodiment, the object 110 may move in the 3D space along one or more of the X, Y, or Z axes, while the first group of images and/or the second group of images may be captured. The set of images may include the first group of images and the second group of images. Further, the set of viewpoints may include at least the first group of viewpoints and/or the second group of viewpoints. For example, the captured set of images may include a first image 112A, a second image 112B, and a third image 112C. The set of image sensors 106 may be configured to transmit the captured set of images to the electronic device 102, via the communication network 108. Each of the image sensors 106A and 106B may be pre-calibrated. Further, the operations of the image sensors 106A and 106B may be synchronized such that the set of images may be captured concurrently. Examples of each of the image sensors 106A and 106B may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices. In one embodiment, the set of image sensors 106 may be implemented as a component of the electronic device 102.

The communication network 108 may include a communication medium through which the electronic device 102 may communicate with the server 104 and the set of image sensors 106. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN), a mobile wireless network, such as a Long-Term Evolution (LTE) network (for example, $4^{th}$ Generation or $5^{th}$ Generation (5G) mobile network (i.e. 5G New Radio)). Various devices of the network environment 100 may be configured to connect to the communication network 108, in accordance with various wired or wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, Bluetooth (BT) communication protocols, or a combination thereof.

In operation, the set of image sensors 106 may be configured to capture a set of images of the object 110 from a set of viewpoints. For example, the set of image sensors 106 may include the first group of image sensors 106A at the first vertical level 114A surrounding the object 110. The set of image sensors 106 may further include the second group of image sensors 106B at the second vertical level 114B surrounding the object 110. The first group of image sensors 106A may capture a first group of images of the object 110 from a first group of viewpoints at the first vertical level 114A, simultaneously. Similarly, the second group of image sensors 106B may capture a second group of images of the object 110 from a second group of viewpoints at the second vertical level 114B, simultaneously. In an embodiment, the object 110 may be stationary while the first group of images and/or the second group of images may be captured. In another embodiment, the object 110 may move in the 3D space along one or more of the X, Y, or Z axes, while the first group of images and/or the second group of images may be captured. The set of images may include the first group of images and the second group of images. Further, the set of viewpoints may include at least the first group of viewpoints and/or the second group of viewpoints. In an example, the captured set of images may include the first image 112A, the second image 112B, and the third image 112C. The set of image sensors 106 may be configured to transmit the captured set of images of the object 110, to the electronic device 102, via the communication network 108. In an embodiment, the electronic device 102 may acquire the set of images of the object 110 from the set of image sensors 106.

The electronic device 102 may be configured to estimate a first 3D mesh of the head portion of the object 110, based on the acquired set of images. The electronic device 102 may be further configured to execute a first set of operations on the estimated first 3D mesh to generate a second 3D mesh. The executed first set of operations may include one or more of, but not limited to, a removal of one or more regions which may be unneeded for shape estimation of the object 110 (e.g., for head-shape estimation) and/or a removal of one or more mesh artifacts associated with a 3D shape or a topology of the first 3D mesh.

The electronic device 102 may be further configured to acquire a 3D template mesh. For example, the server 104 may be configured to transmit the 3D template mesh stored on the server 104, to the electronic device 102, via the communication network 108. The electronic device 102 may be further configured to process the acquired 3D template mesh to determine a set of filling patches corresponding to a set of holes in the generated second 3D mesh. Once the set of filling patches is determined, the electronic device 102 may be configured to execute a hole filling operation to generate a final 3D mesh. The execution of the hole filing operation may be based on the generated second 3D mesh and the determined set of filling patches. Various operations of the electronic device 102 for shape refinement of a 3D mesh reconstructed from images are described further, for example, in FIGS. 3, 4, 5A, 5B, 5C, 6A, 6B, 6C, 7A, 7B, 8A, 8B, 8C, 9A 9B, 10A, 10B, 11A, 11B, 12A, 12B, 12C, 13, 14, and 15.

Figure 2:
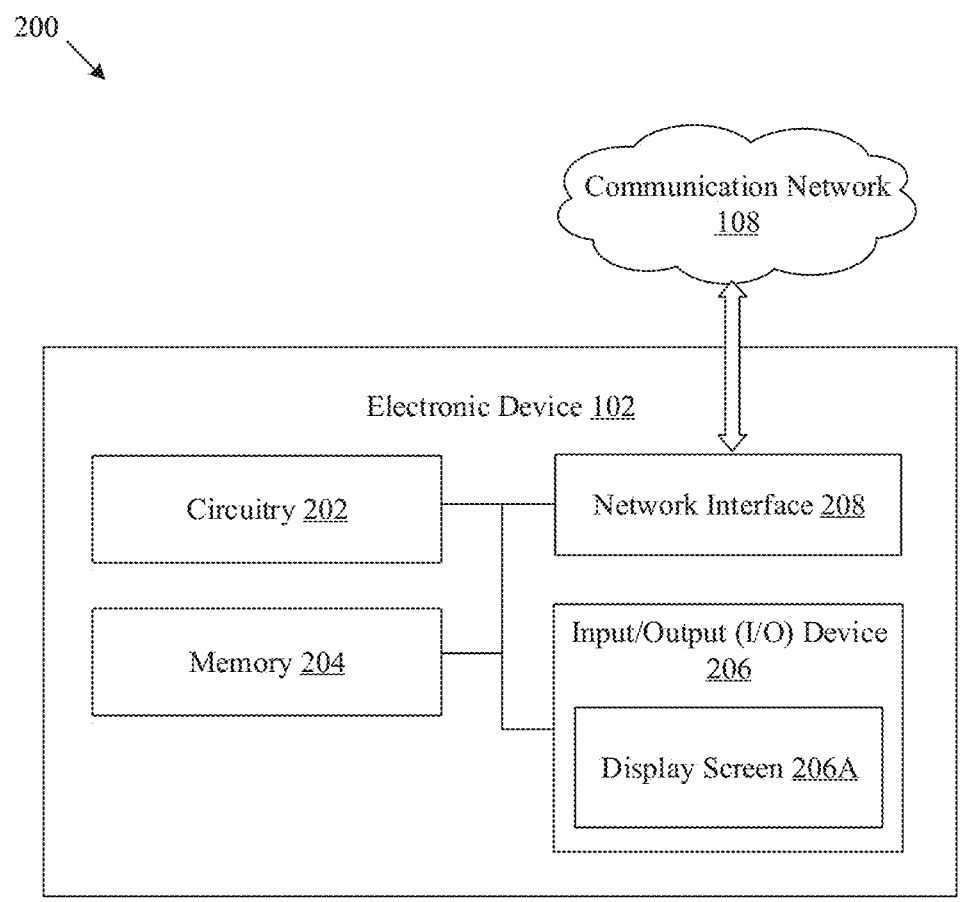
FIG. 2 is a block diagram that illustrates an exemplary electronic device, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the electronic device 102. The electronic device 102 may include circuitry 202, a memory 204, an input/output (I/O) device 206, and a network interface 208. The I/O device 206 may include a display screen 206A. The circuitry 202 may be communicatively coupled to the memory 204, the I/O device 206, and the network interface 208. The circuitry 202 may be configured to communicate with the server 104 and the set of image sensors 106, by use of the network interface 208.

The circuitry 202 may include suitable logic, circuitry, and interfaces that may be configured to execute program instructions associated with different operations to be executed by the electronic device 102. The circuitry 202 may be implemented based on a number of processor technologies known in the art. Examples of the processor technologies may include, but are not limited to, a Central Processing Unit (CPU), an x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

The memory 204 may include suitable logic, circuitry, and/or interfaces that may be configured to store a set of instructions executable by the circuitry 202. The memory 204 may be configured to store an operating system and associated applications. In accordance with an embodiment, the memory 204 may be also configured to store the acquired set of images of the object 110. The memory 204 may also store the estimated first three-dimensional (3D) mesh, the generated second 3D mesh, the acquired 3D template mesh, the determined set of filling patches, and the generated final 3D mesh. Examples implementations of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input from a user. For example, the I/O device 206 may be configured to receive instructions to capture the set of images as a user input. The I/O device 206 may be also configured to provide an output to the user. For example, as part of the I/O device 206, the display screen 206A may render the final 3D mesh of the head portion of the object 110. The I/O device 206 may include various input and output devices, which may be configured to communicate with the circuitry 202. Examples of the input devices may include, but are not limited to, a touch screen, a keyboard, a mouse, a joystick, and/or a microphone. Examples of the output devices may include, but are not limited to, the display screen 206A and/or a speaker.

The display screen 206A may include suitable logic, circuitry, interfaces, and/or code that may be configured to render an application interface to display the final 3D mesh of the head portion of the object 110. In accordance with an embodiment, the display screen 206A may be a touch screen, where input from the user may be received via the application interface. The display screen 206A may capture the input based on an input received from the user. The user may be able to provide inputs by activating and/or interacting with one or more of a plurality of buttons or UI elements displayed on the touch screen. In accordance with an embodiment, the display screen 206A may receive the input through a virtual keypad, a stylus, a gesture-based input, and/or a touch-based input. The display screen 206A may be realized through several known technologies such as, but not limited to, at least one of a Liquid Crystal Display (LCD) display, a Light Emitting Diode (LED) display, a plasma display, and/or an Organic LED (OLED) display technology, and/or other display. In accordance with an embodiment, the display screen 206A may refer to a display screen of smart-glass device, a see-through display, a projection-based display, an electro-chromic display, and/or a transparent display.

The network interface 208 may include suitable logic, circuitry, code, and/or interfaces that may be configured to facilitate communication among the circuitry 202, the server 104, and the set of image sensors 106, via the communication network 108. The network interface 208 may be implemented by use of various known technologies to support wired or wireless communication of the electronic device 102 with the communication network 108. The network interface 208 may include, but not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), a $5^{th}$ generation network such as 5G new radio (NR) network, a 5G smart antenna, time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The network interface 208 may be capable to communicate with a 5G communication network and will include appropriate 5G support functionality such as, but not limited to, a 5G NR, a V2X Infrastructure, and a 5G Smart Antenna. Various operations of the circuitry 202 for shape refinement of a 3D mesh reconstructed from images are described further, for example, in FIGS. 3, 4, 5A, 5B, 5C, 6A, 6B, 6C, 7A, 7B, 8A, 8B, 8C, 9A 9B, 10A, 10B, 11A, 11B, 12A, 12B, 12C, 13, 14, and 15.

Figure 3:
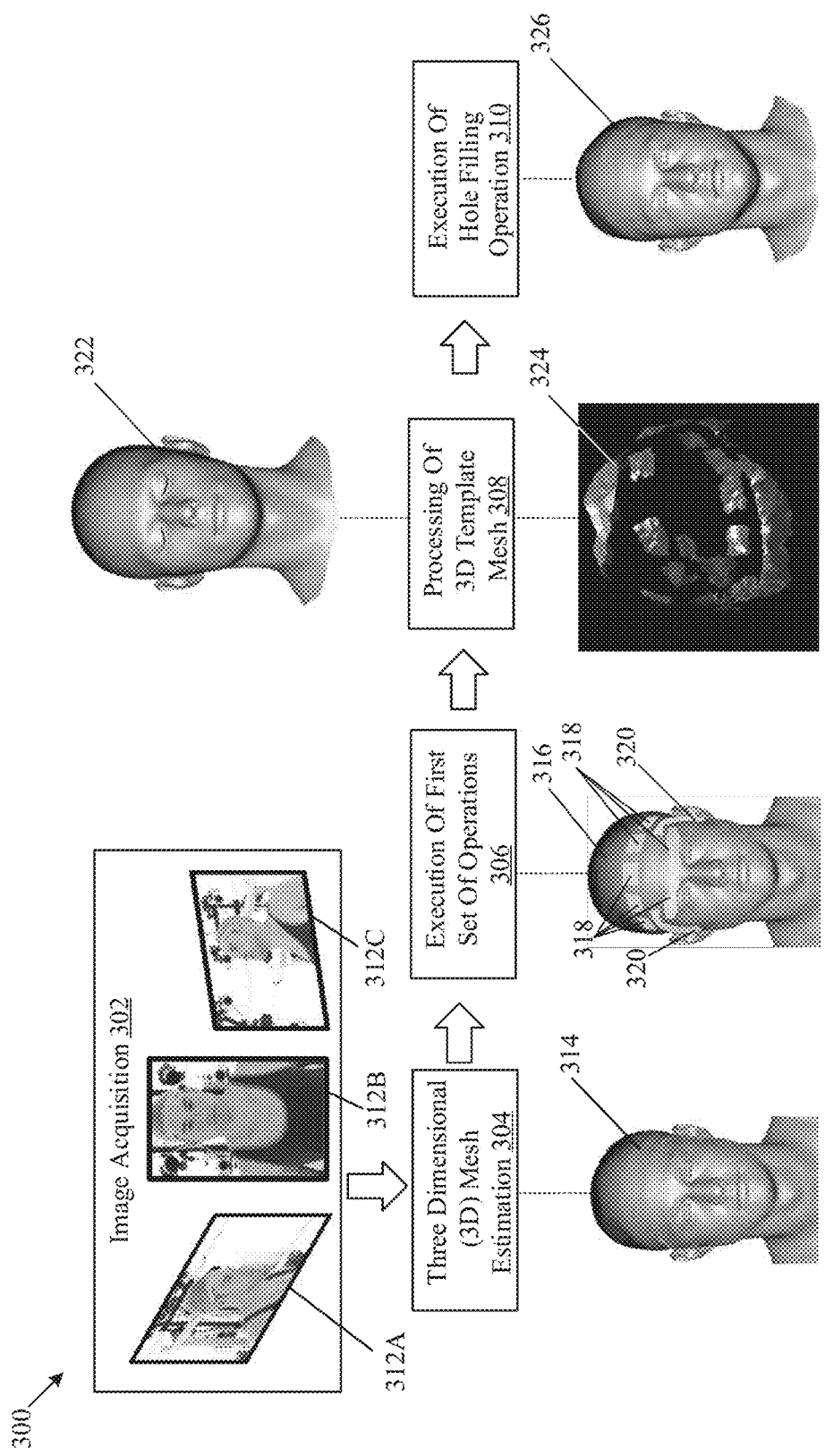
FIG. 3 is a diagram that illustrates an exemplary processing pipeline for shape refinement of a three-dimensional (3D) mesh reconstructed from images, in accordance with an embodiment of the disclosure.

FIG. 3 is a diagram that illustrates an exemplary processing pipeline for shape refinement of a three-dimensional (3D) mesh reconstructed from images, in accordance with an embodiment of the disclosure. FIG. 3 is explained in conjunction with elements from FIG. 1 and FIG. 2. With reference to FIG. 3, there is shown a processing pipeline of operations from 302 to 310 to depict shape refinement of a 3D mesh reconstructed from images. The circuitry 202 may execute the operations from 302 to 310.

At 302, an image acquisition operation for the object 110 may be executed. In an embodiment, the set of image sensors 106 may be configured to execute the image acquisition of the object 110. For the image acquisition operation, the set of image sensors 106 may capture a set of images of the object 110 from a set of viewpoints. Each of the image sensors 106A and 106B may be pre-calibrated. For example, the first image sensor 106A may capture one or more first images of the object 110 from one or more first viewpoints along the first trajectory 114A. Similarly, the second image sensor 106B may capture one or more second images of the object 110 from one or more second viewpoints along the second trajectory 114B. The set of images captured by the set of image sensors 106 may include the one or more first images and the one or more second images.

For example, the set of image sensors 106 may include the first group of image sensors 106A at the first vertical level 114A surrounding the object 110. The set of image sensors 106 may further include the second group of image sensors 106B at the second vertical level 114B surrounding the object 110. The first group of image sensors 106A may capture a first group of images of the object 110 from a first group of viewpoints at the first vertical level 114A, simultaneously. Similarly, the second group of image sensors 106B may capture a second group of images of the object 110 from a second group of viewpoints at the second vertical level 114B, simultaneously. In an embodiment, the object 110 may be stationary while the first group of images and/or the second group of images may be captured. In another embodiment, the object 110 may move in the 3D space along one or more of the X, Y, or Z axes, while the first group of images and/or the second group of images may be captured. The set of images may include the first group of images and the second group of images. Further, the set of viewpoints may include at least the first group of viewpoints and/or the second group of viewpoints. For example, the captured set of images may include a first image 312A, a second image 312B, and a third image 312C. The first image 312A may be captured from a first viewpoint that may correspond to a non-frontal pose of the head of the object 110 at +30 degrees yaw axis. The second image 312B may be captured from a second viewpoint that may correspond to a frontal pose of the head of the object 110 at a 0-degree yaw axis. Further, the third image 312C may be captured from a third viewpoint that may correspond to another non-frontal pose of the head of the object 110 at a −30 degrees yaw axis.

The set of image sensors 106 may be configured to transmit the set of images (e.g., the first image 312A, the second image 312B, and the third image 312C) of the object 110 to the electronic device 102, via the communication network 108. Alternatively, the circuitry 202 may acquire the set of images (e.g., the first image 312A, the second image 312B, and the third image 312C) from the set of image sensors 106. For example, in a scenario where the set of image sensors 106 is implemented as a component of the electronic device 102, the circuitry 202 may acquire the set of images (e.g., the first image 312A, the second image 312B, and the third image 312C) from the set of image sensors 106.

At 304, a three-dimensional (3D) mesh may be estimated. In an embodiment, the circuitry 202 may be configured to estimate a first 3D mesh of a head portion of the object 110 based on the acquired set of images. The method of estimation of the first 3D mesh may include, for example, a photogrammetry-based method (such as structure from motion (SfM)), a method which requires stereoscopic images, or a method which requires monocular cues (such as shape from shading (SfS), photometric stereo, or shape from texture (SfT)). Details of such techniques have been omitted from the disclosure for the sake of brevity.

In an embodiment, the circuitry 202 may use a photogrammetric reconstruction method to estimate the first 3D mesh of the head portion of the object 110 based on the acquired set of images. The photogrammetric reconstruction method may include operations, such as, but not limited to, a feature detection and matching operation, a sparse reconstruction operation, a multi-view stereo operation, and a fusion and meshing operation. By way of an example, and not limitation, the photogrammetric reconstruction may be a Structure-from-motion based reconstruction, as described in, Schönberger, Johannes L., and Jan-Michael Frahm, "Structure-from-motion revisited", Proceedings IEEE Conference on Computer Vision and Pattern Recognition (CVPR), 2016. By way of another example, and not limitation, the photogrammetric reconstruction may be based on a pixelwise view selection, as described in, Schönberger, Johannes L., et al., "Pixelwise view selection for unstructured multi-view stereo", European Conference on Computer Vision (ECCV), 2016. As shown, for example, a first 3D mesh 314 may be estimated based on the acquired set of images.

At 306, a first set of operations may be executed on the estimated first 3D mesh 314. In an embodiment, the circuitry 202 may be configured to execute the first set of operations on the estimated first 3D mesh 314 to generate a second 3D mesh (e.g., a second 3D mesh 316). The execution of the first set of operations may include one or more of, but not limited to, a removal of one or more regions which may be unneeded for shape estimation of the object 110 (e.g., for head-shape estimation of the object 110) from the first 3D mesh 314 and/or a removal of one or more mesh artifacts associated with a 3D shape or a topology of the first 3D mesh 314 from the first 3D mesh 314. The one or more regions which may be unneeded for the head-shape estimation may include at least one of coded target meshes or hair meshes. Further, the one or more mesh artifacts associated with the 3D shape or the topology may include a first mesh artifact in which one or more facets of the first 3D mesh 314 may include edges which may be longer than a threshold. For example, based on the execution of the first set of operations, one or more unneeded regions 318 and one or more mesh artifacts 320 may be removed from the first 3D mesh 314 to generate the second 3D mesh 316. The removal of the one or more unneeded regions 318 and/or the removal of the one or more mesh artifacts 320 from the first 3D mesh 314 may generate a set of holes in the generated second 3D mesh 316.

The execution of the first set of operations on the first 3D mesh 314 may be required as the first 3D mesh 314 (i.e., a 3D mesh reconstructed from the set of images) may not be usable directly in applications. This may be because certain regions of the head portion of the first 3D mesh 314 may not be reconstructed accurately from the set of images due to insufficient number of views associated with the regions. Further, coded target meshes in the first 3D mesh 314 may not be needed for further operations or applications. Such coded target meshes may be attached to the head portion represented in the first 3D mesh 314 for calibration purposes and may not be required after the estimation of the first 3D mesh 314.

In various applications, synthetic hair may be added at a later stage (such as after a mesh cleanup). Therefore, mesh artifacts such as, eyebrows, eyelashes, hair, and other facial hair may not be needed for further operations or applications. In some instances, the topology of certain regions of the first 3D mesh 314 may be random. Various applications, such as games and motion pictures, may require specific mesh topology. Hence, such regions with random mesh topology may need to be removed from the first 3D mesh 314. The removal of such unneeded regions is described further in FIGS. 5A, 5B, and 5C, for example. Also, the removal of the one or more mesh artifacts is described in FIGS. 4, 6A, 6B, and 6C, for example.

In an embodiment, the circuitry 202 may be further configured to determine a dihedral angle between a pair of adjoining edges of the first 3D mesh 314. Thereafter, the circuitry 202 may determine the pair of adjoining edges as a second mesh artifact (i.e. a spike) of the one or more mesh artifacts, based on whether the determined dihedral angle is above a threshold. The removal of the second mesh artifact may include at least one of a removal of the determined pair of edges or a relaxation of the determined pair of edges using a Laplacian smoothening operation. The removal of the second mesh artifact is described further, for example, in FIGS. 6A, 6B, and 6C.

In an embodiment, the circuitry 202 may be configured to refine a boundary associated with each of the set of holes in the generated second 3D mesh 316 based on execution of an erosion operation over the boundary associated with each of the set of holes. In an embodiment, the circuitry 202 may be configured to classify the set of holes in the generated second 3D mesh 316 into one or more first holes and one or more second holes. The number of vertices in a boundary of the one or more first holes may be below a threshold (e.g., 100 vertices) and the number of vertices in a boundary of the one or more second holes may be above a threshold (e.g., 100 vertices). In an embodiment, the circuitry 202 may be configured to fill the one or more first holes in the generated second 3D mesh 316 based on a shape of a boundary associated with each of the one or more first holes. The refinement of the boundary associated with each hole is described further, for example, in FIGS. 7A and 7B. The classification of the set of holes is described further, for example, in FIG. 8A. The one or more first holes may be filled as described further, for example, in FIGS. 8B and 8C.

At 308, a 3D template mesh may be processed. In an embodiment, the circuitry 202 may be configured to process the 3D template mesh (e.g., a 3D template mesh 322) of a head portion of an object, such as, the object 110 (for example, a human subject, or an animal, or a statue/portrait of a human subject or an animal). The circuitry 202 may be configured to acquire the 3D template mesh 322. For example, the 3D template mesh 322 may be stored on the server 104. The server 104 may be configured to transmit the 3D template mesh 322 stored on the server 104, to the electronic device 102, via the communication network 108. In an embodiment, the 3D template mesh 322 may be pre-stored in the memory 204. The 3D template mesh 322 may be a template head mesh of an object (e.g., the object 110, such as a human subject, an animal, or a statue/portrait of a human subject or an animal). The 3D template mesh may represent a 3D topology or shape of an average head portion or facial region of the object 110. The 3D template mesh may be designed based on inputs from a human modeler.

The acquired 3D template mesh 322 may be processed to determine a set of filling patches (e.g., a set of filling patches 324) corresponding to the set of holes in the generated second 3D mesh 316. The 3D template mesh 322 may be processed by execution of a first operation and a second operation. The first operation may be to warp, for a non-hole region of the second 3D mesh 316, the 3D template mesh 322 based on a shape of the second 3D mesh 316 to obtain a warped template mesh (not shown in FIG. 3). The second operation may be to update the warped template mesh with a first boundary corresponding to the warpage of the non-hole region. The 3D template mesh 322 may be further processed to execute a mesh retopology operation that may include a projection of the second 3D mesh 316 to the updated template mesh (not shown in FIG. 3). The mesh retopology operation may further include a determination of a set of triangles from the updated template mesh. The set of triangles may be associated with a first set of vertices at the first boundary corresponding to the warpage of the non-hole region. The mesh retopology operation may further include a determination a set of candidate vertices associated with the determined set of triangles, based on the second 3D mesh 316. The mesh retopology operation may further include a connection of the determined set of candidate vertices to obtain a boundary (hereinafter referred as obtained boundary, second boundary, or obtained second boundary) of a first filling patch of the set of filling patches 324. Further, the mesh topology operation may include a determination of the first filling patch based on the obtained second boundary. The first operation and the second operation are further described, for example, in FIGS. 9A and 9B. The mesh retopology operation is further described, for example, in FIGS. 10A and 10B.

At 310, a hole filling operation may be executed. In an embodiment, the circuitry 202 may be configured to execute the hole filling operation based on the generated second 3D mesh 316 and the determined set of filling patches 324 to generate a final 3D mesh (e.g., a final 3D mesh 326). The execution of the hole filling operation may include a combination of the set of filling patches 324 with the projected 3D mesh (not shown in FIG. 3) to obtain a connected mesh. The execution of the hole filling operation may further include a filling-up of gaps between connecting parts of the connected mesh to obtain a re-topologized 3D mesh (not shown in FIG. 3).

The circuitry 202 may be further configured to determine a set of adjacent boundary intervals based on the projected 3D mesh and the set of filling patches 324 included in the connected mesh. Further, the circuitry 202 may connect the determined set of adjacent boundary intervals in a pairwise manner to fill-up the gaps with triangles. The execution of the hole filling operation may further include an alpha-blending operation of the re-topologized 3D mesh and the second 3D mesh 316 to obtain an alpha-blended 3D mesh (not shown in FIG. 3). Further, the execution of the hole filling operation may include a pyramid-blending operation of the alpha-blended 3D mesh and the 3D template mesh to obtain a pyramid-blended 3D mesh (not shown in FIG. 3). The circuitry 202 may be further configured to execute a remeshing operation on the pyramid-blended 3D mesh to generate the final 3D mesh 326. The execution of the hole filling operation is described further, for example, in FIGS. 11A, 11B, 12A, 12B, 12C, 13, and 14. The execution of the remeshing operation is described further, for example, in FIG. 15.

In conventional methods, a 3D mesh that represents a 3D geometry of an object may be manually refined. A human modeler may manually select regions in the 3D mesh that may not be required. The human modeler may also manually select and remove artifacts and other defects from the 3D mesh. The human modeler may refine the 3D mesh by manual selection of vertices of the 3D mesh and an update of locations of the selected vertices in the 3D mesh. Manual refinement of the 3D mesh may require significant amount of time and effort and may be prone to errors. In contrast, the present disclosure may provide a new method for automated shape refinement of a 3D mesh reconstructed from the set of images of an object (e.g., the object 110). The final 3D mesh 326 may represent the 3D shape of the object 110 with a higher accuracy and with improved quality as compared with that from the conventional methods. As the final 3D mesh 326 may be generated automatically, manual effort and time may be saved, as compared to conventional methods.

Figure 4:
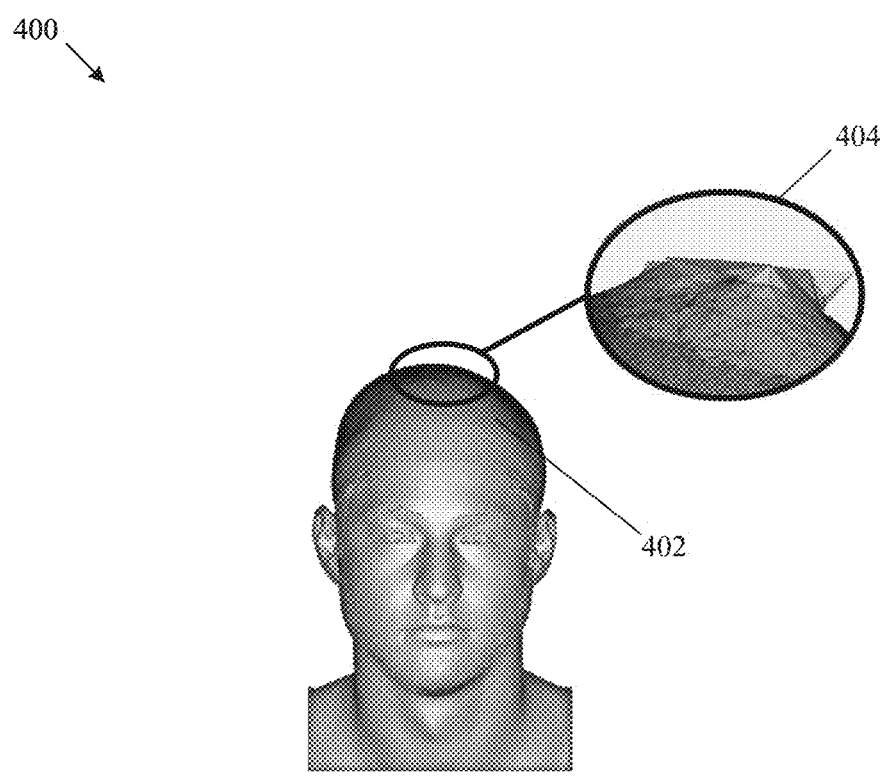
FIG. 4 is a diagram that illustrates removal of an exemplary first mesh artifact associated with a 3D shape or a topology of a first 3D mesh of a head portion of an object, in accordance with an embodiment of the disclosure.

FIG. 4 is a diagram that illustrates removal of an exemplary first mesh artifact associated with a 3D shape or a topology of a first 3D mesh of a head portion of an object, in accordance with an embodiment of the disclosure. FIG. 4 is described in conjunction with elements from FIGS. 1, 2, and 3. With reference to FIG. 4, there is shown a diagram 400. The diagram 400 may include a first 3D mesh 402 of a head portion of an object (e.g., the object 110).

The first 3D mesh 402 may include one or more mesh artifacts associated with a 3D shape or a topology of the first 3D mesh 402. The one or more mesh artifacts may include a first mesh artifact 404 in which one or more facets of the first 3D mesh 402 include edges which may be longer than a threshold. For example, the first mesh artifact 404 may be a region on a top of the head portion of the object 110, as shown in FIG. 4. The first 3D mesh 402 may include a region that be formed from insufficient number of viewpoints of different images in the set of images. The first mesh artifact 404 may belong to such region in the first 3D mesh 402. Points in the first mesh artifact 404 may be sparser than points in other regions in the first 3D mesh 402. The sparsity of the points in the first mesh artifact 404 may make edges of the points in the first mesh artifact 404 longer than edges in other regions of the first 3D mesh 402. In other words, the edges that connect points in the first mesh artifact 404 may be longer than edges that connect points in other regions due to insufficiency of the points. Hence, the first mesh artifact 404 may correspond to an incorrect region. The circuitry 202 may be configured to remove the one or more mesh artifacts including, but not limited to, the first mesh artifact 404. It should be noted that the diagram 400 is for exemplary purpose and should not be construed as limiting the present disclosure.

Figures 5A, 5B, 5C:
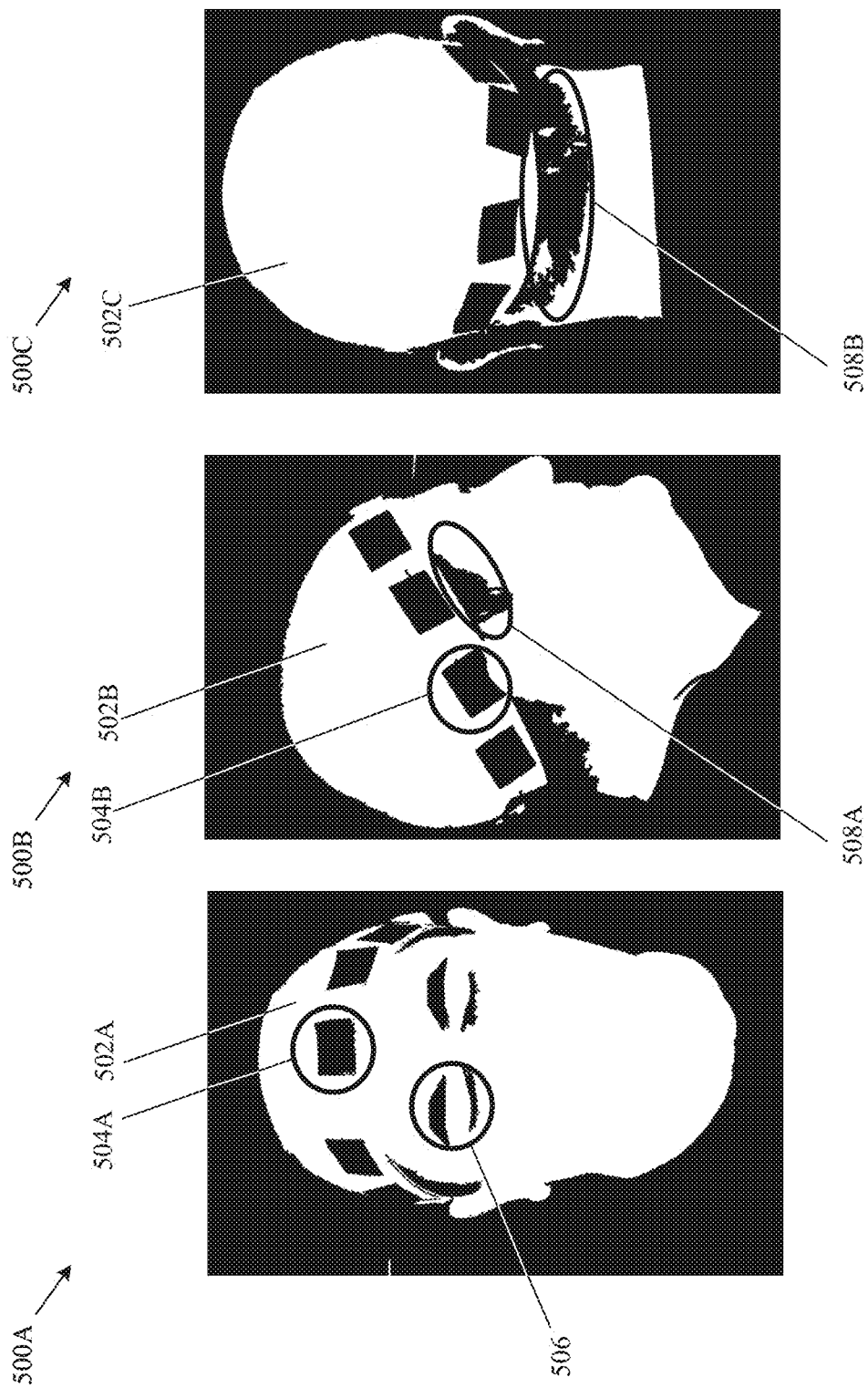
FIGS. 5A, 5B, and 5C are diagrams that illustrate removal of exemplary one or more regions unneeded for shape estimation of an object from a first 3D mesh of a head portion of the object, in accordance with an embodiment of the disclosure.

FIGS. 5A, 5B, and 5C are diagrams that illustrate removal of exemplary one or more regions unneeded for shape estimation of an object from a first 3D mesh of a head portion of the object, in accordance with an embodiment of the disclosure. FIGS. 5A, 5B, and 5C are described in conjunction with elements from FIGS. 1, 2, 3, and 4. With reference to FIG. 5A, there is shown a diagram 500A. The diagram 500A may include a front view 502A of a first 3D mesh (e.g., the first 3D mesh 314) of a head portion of an object (e.g., the object 110). The front view 502A of the first 3D mesh may include a first coded target mesh 504A and an eyebrow/eyelash hair mesh 506. With reference to FIG. 5B, there is shown a diagram 500B. The diagram 500B may include a side view 502B of the first 3D mesh (e.g., the first 3D mesh 314) of the head portion of the object 110. The side view 502B of the first 3D mesh may include a second coded target mesh 504B and a first hair mesh 508A. With reference to FIG. 5C, there is shown a diagram 500C. The diagram 500C may include a rear view 502C of the first 3D mesh (e.g., the first 3D mesh 314) of the head portion of the object 110. The rear view 502C of the first 3D mesh may include a second hair mesh 508B.

In an embodiment, the one or more regions which may be unneeded in the first 3D mesh (e.g., the first 3D mesh 314) for head-shape estimation may include at least one of coded target meshes or hair meshes. Examples of the coded target meshes may include, but are not limited to, the first coded target mesh 504A in the front view 502A of the first 3D mesh and the second coded target mesh 504B in the side view 502B of the first 3D mesh. Examples of the hair meshes may include, but are not limited to, the eyebrow/eyelash hair mesh 506 in the front view 502A of the first 3D mesh, the first hair mesh 508A in the side view 502B of the first 3D mesh, and the second hair mesh 508B in the rear view 502C of the first 3D mesh.

The one or more regions which may be unneeded in the first 3D mesh may be determined by use of various techniques. For example, the circuitry 202 may apply a hair segmentation technique on the set of images to determine the hair meshes, such as the first hair mesh 508A and the second hair mesh 508B. The hair segmentation technique may be based on a deep-learning model or any suitable segmentation model. The circuitry 202 may apply a coded target detection technique on the set of images to determine the coded target meshes, such as the first coded target mesh 504A and the second coded target mesh 504B. For example, the coded target detection may use a quad detection-based method to determine the coded target meshes. The circuitry 202 may apply an eyebrow/eyelash segmentation technique on the set of images to determine eyebrow/eyelash meshes, such as the eyebrow/eyelash hair mesh 506. For example, a facial feature detector may be used to determine the eyebrow/eyelash meshes. The circuitry 202 may be configured to mask the determined one or more regions which may be unneeded for head-shape estimation in the set of images. The circuitry 202 may be further configured to back-project the masked one or more regions to the first 3D mesh. The circuitry 202 may be configured to remove the masked one or more regions from the first 3D mesh (e.g., the first 3D mesh 314) to generate a second 3D mesh (e.g., the second 3D mesh 316). It should be noted that the diagrams 500A, 500B, and 500C are for exemplary purpose and should not be construed as limiting the present disclosure.

Figure 6A:
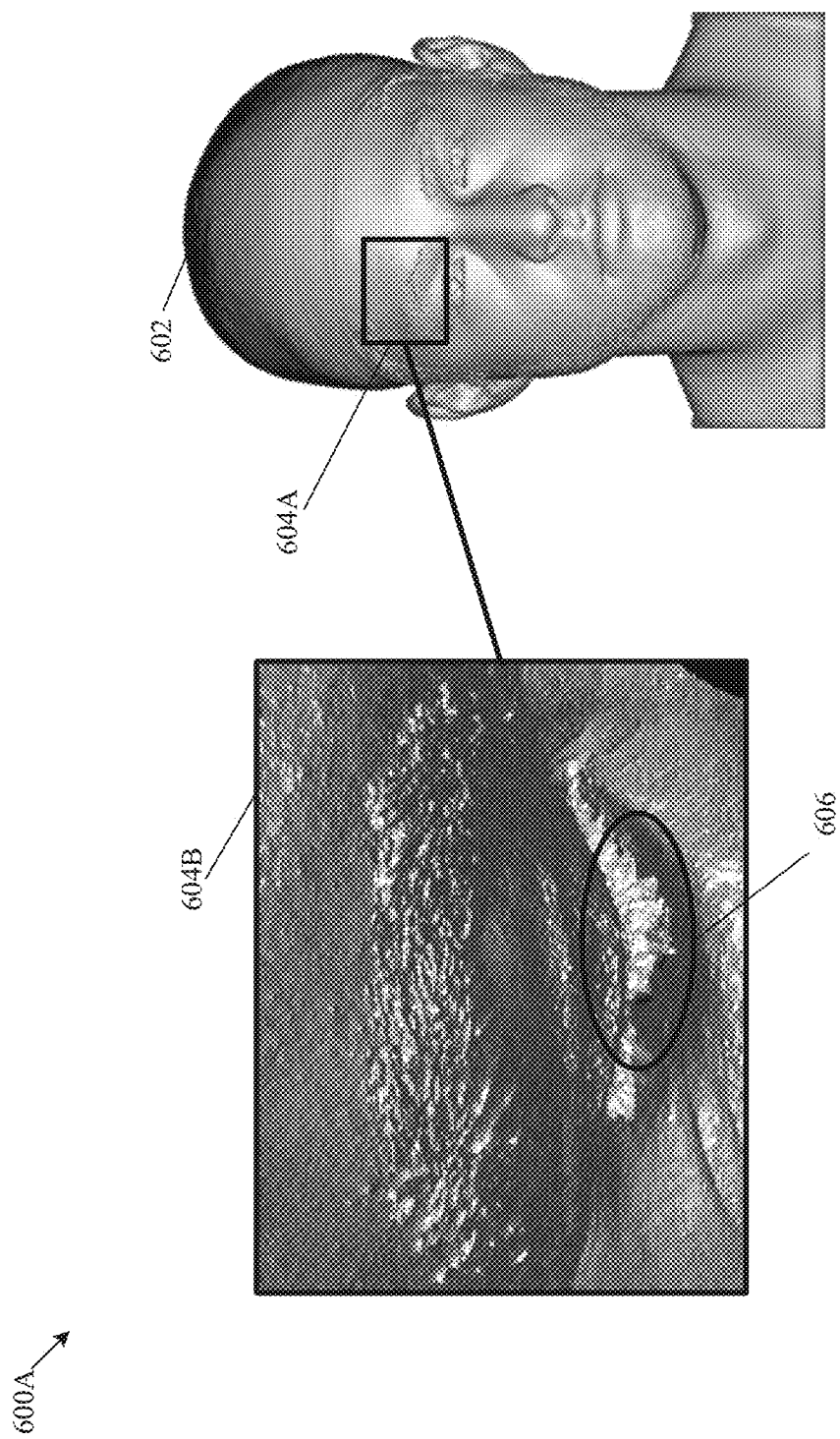
FIG. 6A is a diagram that illustrates an exemplary second mesh artifact in a first 3D mesh of a head portion of an object, in accordance with an embodiment of the disclosure.

FIG. 6A is a diagram that illustrates an exemplary second mesh artifact in a first 3D mesh of a head portion of an object, in accordance with an embodiment of the disclosure. FIG. 6A is described in conjunction with elements from FIGS. 1, 2, 3, 4, 5A, 5B, and 5C. With reference to FIG. 6A, there is shown a diagram 600A. The diagram 600A may include a first 3D mesh 602 of a head portion of an object (e.g., the object 110). The first 3D mesh 602 may further include a first region 604A that may include a mesh artifact (e.g., a second mesh artifact). The diagram 600A may further include a first expanded view 604B of the first region 604A. The first expanded view 604B may include artifacts 606 that may be examples of the second mesh artifact. For example, the artifacts 606 in the first region 604A may be caused in vicinity of eyelashes, which may not be properly reconstructed in the first 3D mesh 602. The artifacts 606 may appear as spikes in the first region 604A. Such spikes may occur in regions of the first 3D mesh 602 that may include facial hair or other regions with mesh reconstruction errors.

Figures 6B, 6C:
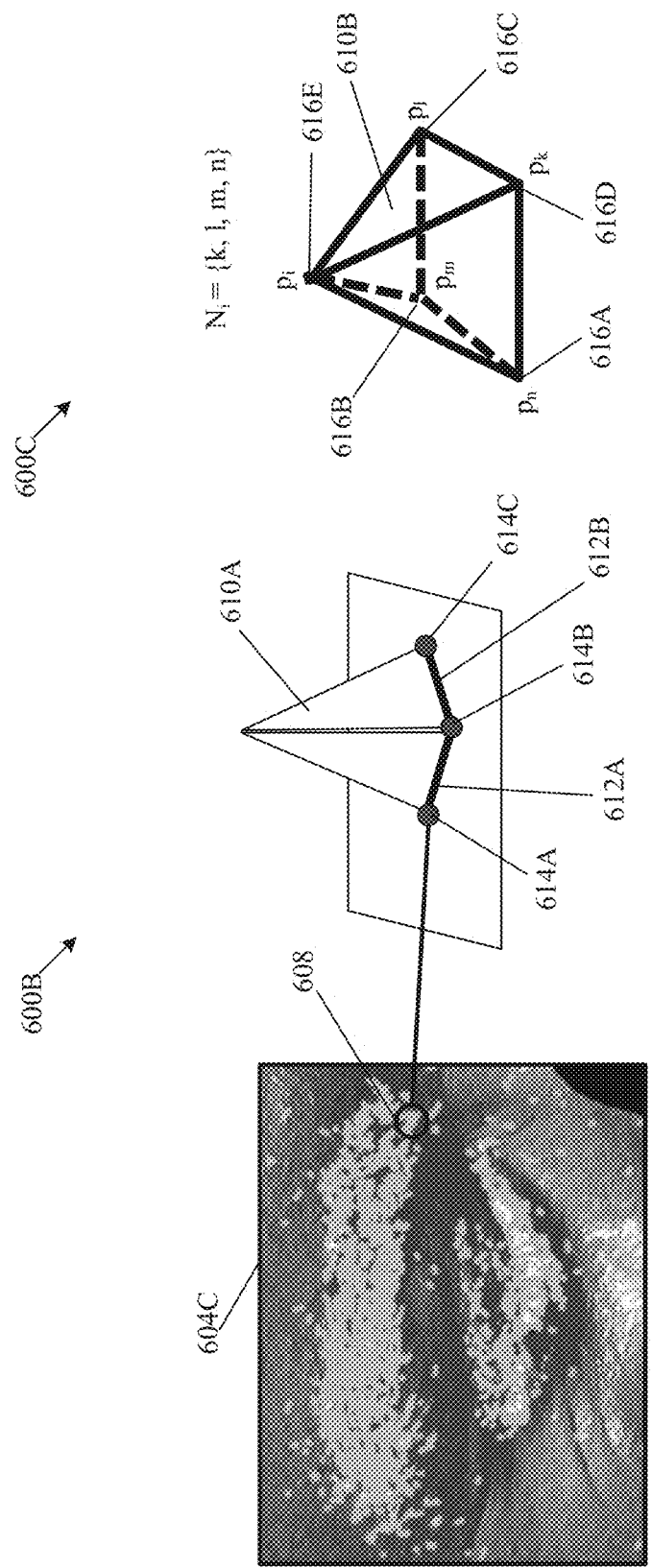
FIG. 6B is a diagram that illustrates a set of vertices associated an exemplary second mesh artifact in a first 3D mesh of a head portion of an object, in accordance with an embodiment of the disclosure.
FIG. 6C is a diagram that illustrates removal of an exemplary second mesh artifact in a first 3D mesh of a head portion of an object, in accordance with an embodiment of the disclosure.

FIG. 6B is a diagram that illustrates a set of vertices associated an exemplary second mesh artifact in a first 3D mesh of a head portion of an object, in accordance with an embodiment of the disclosure. FIG. 6B is described in conjunction with elements from FIGS. 1, 2, 3, 4, 5A, 5B, 5C, and 6A. With reference to FIG. 6B, there is shown a diagram 600B. The diagram 600B may include a second expanded view 604C of the first region 604A. The second expanded view 604C may include a set of vertices 608 of the first 3D mesh 602. The set of vertices 608 may be correspond to a pyramid 610A. The pyramid 610A may be associated with a second mesh artifact that may appear as a spike. The spike may be a protrusion of a set of triangles on a relatively-flat portion of a surface of the first 3D mesh 602. The spike may be caused due to meshing by use of insufficient points in the first 3D mesh 602. The base of the pyramid 610A on the surface of the first 3D mesh 602 may include the set of vertices 608 including a first vertex 614A, a second vertex 614B, a third vertex 614C, and a fourth vertex (not shown in FIG. 6B). The first vertex 614A and the second vertex 614B may be associated with a first edge 612A. Similarly, the second vertex 614B and the third vertex 614C may be associated with a second edge 612B. The first edge 612A and the second edge 612B may be a pair of adjoining edges of the pyramid 610A.

In an embodiment, the circuitry 202 may be configured to determine a dihedral angle between a pair of adjoining edges of the first 3D mesh 602. In an embodiment, the dihedral angle may be an internal angle between intersecting edges of a polygon (e.g., the pyramid 610A). For example, the dihedral angle between the pair of adjoining edges (e.g., the first edge 612A and the second edge 612B) of the first 3D mesh 602 may be an internal angle between the pair of adjoining edges 612A and 612B of the pyramid 610A. In another embodiment, the dihedral angle may be a face angle between normal vectors of intersecting planes or faces of a polygon (e.g., the pyramid 610A). For example, dihedral angle between the pair of adjoining edges 612A and 612B of the first 3D mesh 602 may be a face angle between normal vectors of intersecting triangular faces of the pyramid 610A. The intersecting triangular faces of the pyramid 610A may include a first triangular face with the first edge 612A as a base edge (of the first triangular face) and a second triangular face with the second edge 612B as a base edge (of the second triangular face).

In an embodiment, the circuitry 202 may be configured to determine the pair of adjoining edges (e.g., the first edge 612A and the second edge 612B) as the second mesh artifact of the one or more mesh artifacts, based on whether the determined dihedral angle is above a certain threshold. For example, if the dihedral angle between the first edge 612A and the second edge 612B is determined as above the threshold, the circuitry 202 may determine the edges 612A and 612B as part of the second mesh artifact. In such a case, the pyramid 610A including the set of vertices 608 may be determined as the second mesh artifact (or a spike) in the first 3D mesh 602. In an embodiment, the removal of the second mesh artifact may include at least one of a removal of the determined pair of edges (e.g., the first edge 612A and the second edge 612B) or a relaxation of the determined pair of edges 612A and 612B by use of a Laplacian smoothening operation. In an embodiment, the circuitry 202 may be configured to remove the set of vertices 608 for the removal of the determined pair of edges 612A and 612B. The removal of the determined pair of edges by use of the Laplacian smoothening operation is described further, for example, in FIG. 6C.

FIG. 6C is a diagram that illustrates removal of an exemplary second mesh artifact in a first 3D mesh of a head portion of an object, in accordance with an embodiment of the disclosure. FIG. 6C is described in conjunction with elements from FIGS. 1, 2, 3, 4, 5A, 5B, 5C, 6A, and 6B. With reference to FIG. 6C, there is shown a diagram 600C. The diagram 600C may include an exemplary pyramid 610B that may be similar to the pyramid 610A of the second mesh artifact determined in the first 3D mesh 602. The pyramid 610B may include vertices such as, a first vertex 616A (denoted by $p_n$), a second vertex 616B (denoted by $p_m$), a third vertex 616C (denoted by $p_l$), a fourth vertex 616D (denoted by $p_k$), and a fifth vertex 616E (denoted by $p_i$).

The circuitry 202 may be configured to relax the determined pair of edges (e.g., the first edge 612A and second edge 612B) by use of a Laplacian smoothening operation. For example, a spike (i.e., the second mesh artifact, such as the pyramid 610A including the set of vertices 608) may be relaxed by application of a Laplacian smoothening around 1-ring of the set of vertices 608. The 1-ring may be represented by $N_i = \{k, l, m, n\}$, where the set of vertices 608 may correspond to the vertices 616A, 616B, 616C, and 616D. Herein, the vertex "i" may be an apex vertex (such as, the fifth vertex 616E (denoted by $p_i$)) of the pyramid 610B. The vertices "k", "l", "m", and "n" may be base vertices of the pyramid 610B. For example, the vertex "k" may be the fourth vertex 616D (denoted by $p_k$), the vertex "l" may be the third vertex 616C (denoted by $p_l$), the vertex "m" may be the second vertex 616B (denoted by $p_m$), and the vertex "n" may be the first vertex 616A (denoted by $p_n$). By way of example, and not limitation, the relaxation of the second mesh artifact by application of the Laplacian smoothening may be executed by use of equations (1) and (2), as follows:

$$p_i^{(t+1)} = p_i^{(t)} + \lambda L(p_i^{(t)}) \qquad (1)$$

$$L(p_i) = \frac{1}{\sum_{j \in N_i} w_{ij}} \left( \sum_{j \in N_i} w_{ij} p_j \right) - p_i$$

where,
$p_i^{(t+1)}$ may represent the fifth vertex 616E (denoted by $p_i$) after a $(t+1)^{th}$ iteration,
$p_i^{(t)}$ may represent the fifth vertex 616E (denoted by $p_i$) after a $(t)^{th}$ iteration,
L( ) may represent the Laplacian operation,
$w_{ij}$ may represent a weight associated with a vertex j, and
$\lambda$ may represent a weight associated with the Laplacian operation.

After the second mesh artifact is removed by removal of the determined pair of edges (e.g., the first edge 612A and the second edge 612B) or by relaxation of the determined pair of edges 612A and 612B, the first 3D mesh 602 may be left with holes. The first 3D mesh 602 that may include holes generated after removal of the one or more mesh artifacts (e.g., the first mesh artifact and the second mesh artifact) may be referred as a second 3D mesh. It should be noted that the diagrams 600A, 600B, and 600C are for exemplary purpose and should not be construed as limiting the present disclosure.

FIGS. 7A and 7B are diagrams that illustrate refinement of a boundary associated with each of a set of holes in a second 3D mesh, in accordance with an embodiment of the disclosure. FIGS. 7A and 7B are described in conjunction with elements from FIGS. 1, 2, 3, 4, 5A, 5B, 5C, 6A, 6B, and 6C. With reference to FIG. 7A, there is shown a diagram 700A. The diagram 700A may include a second 3D mesh 702 of a head portion of an object (e.g., the object 110). The diagram 700A may further include a first region 704A of the second 3D mesh 702. The first region 704A may include a set of holes of the second 3D mesh 702. The circuitry 202 may be configured to refine a boundary associated with each of the set of holes (of the first region 704A) in the second 3D mesh 702. The boundary associated with each of the set of holes in the second 3D mesh 702 may be refined to simplify a hole filling operation that may be applied later on the second 3D mesh 702.

With reference to FIG. 7B, there is shown a diagram 700B. The diagram 700B may include a first expanded view 704B of the first region 704A of the second 3D mesh 702. The first expanded view 704B of the first region 704A may include a first hole 706A and a second hole 708A. The diagram 700B may further include a second expanded view 706B of the first hole 706A and a third expanded view 708B of the second hole 708A. The set of holes may be generated by removal of partial regions of a first 3D mesh (e.g., the first 3D mesh 314). As shown in FIG. 7B, the set of holes may include irregular boundaries. In case of the first hole 706A, a vertex (e.g., a vertex 710 shown in FIG. 7B) on a boundary of the first hole 706A may belong to a single facet. In case of the second hole 708A, a dihedral angle between facets along a boundary of the second hole 708A and other facets may be large. For example, the dihedral angle between a pair of adjoining edges 712 (as shown in FIG. 7B) along the boundary of the second hole 708A may be above a certain threshold angle.

In an embodiment, the boundary associated with each of the set of holes (of the first region 704A) in the second 3D mesh 702 may be refined based on execution of an erosion operation over the boundary associated with each of the set of holes. For example, the circuitry 202 may be configured to apply multiple erosion operations over the boundary of each of the set of holes until no irregular vertex or facets along the boundary remain.

The diagram 700B further includes a fourth expanded view 704C of the first region 704A of the second 3D mesh 702. The fourth expanded view 704C may correspond to the first expanded view 704B of the first region 704A of the second 3D mesh 702. The fourth expanded view 704C may be an expanded view of the first region 704A that may be obtained after the application of one or more erosion operations over the boundary associated with each of the set of holes of the first region 704A of the second 3D mesh 702. It should be noted that the diagrams 700A and 700B are for exemplary purpose and should not be construed as limiting the present disclosure.

Figures 8A, 8B:
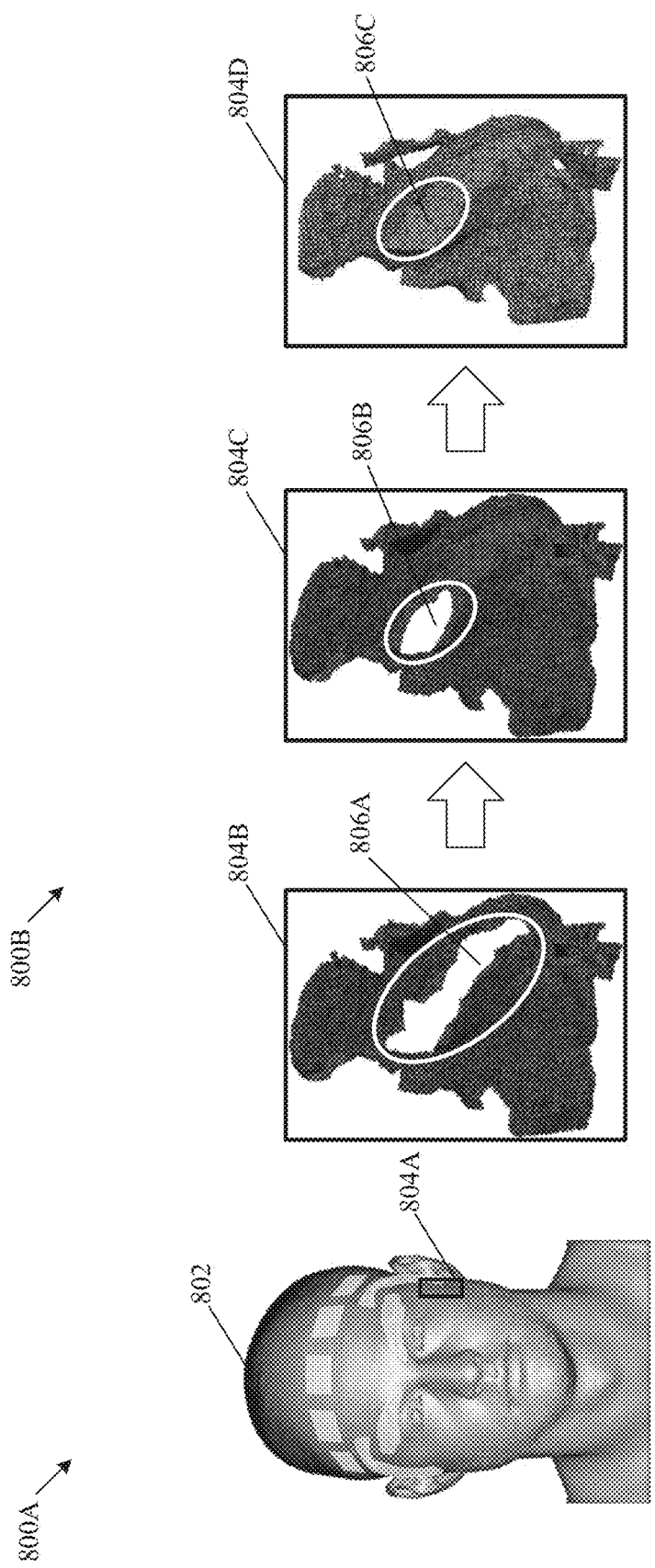
FIGS. 8A, 8B, and 8C are diagrams that illustrate filling of one or more first holes in a second 3D mesh, in accordance with an embodiment of the disclosure.
Figure 8C:
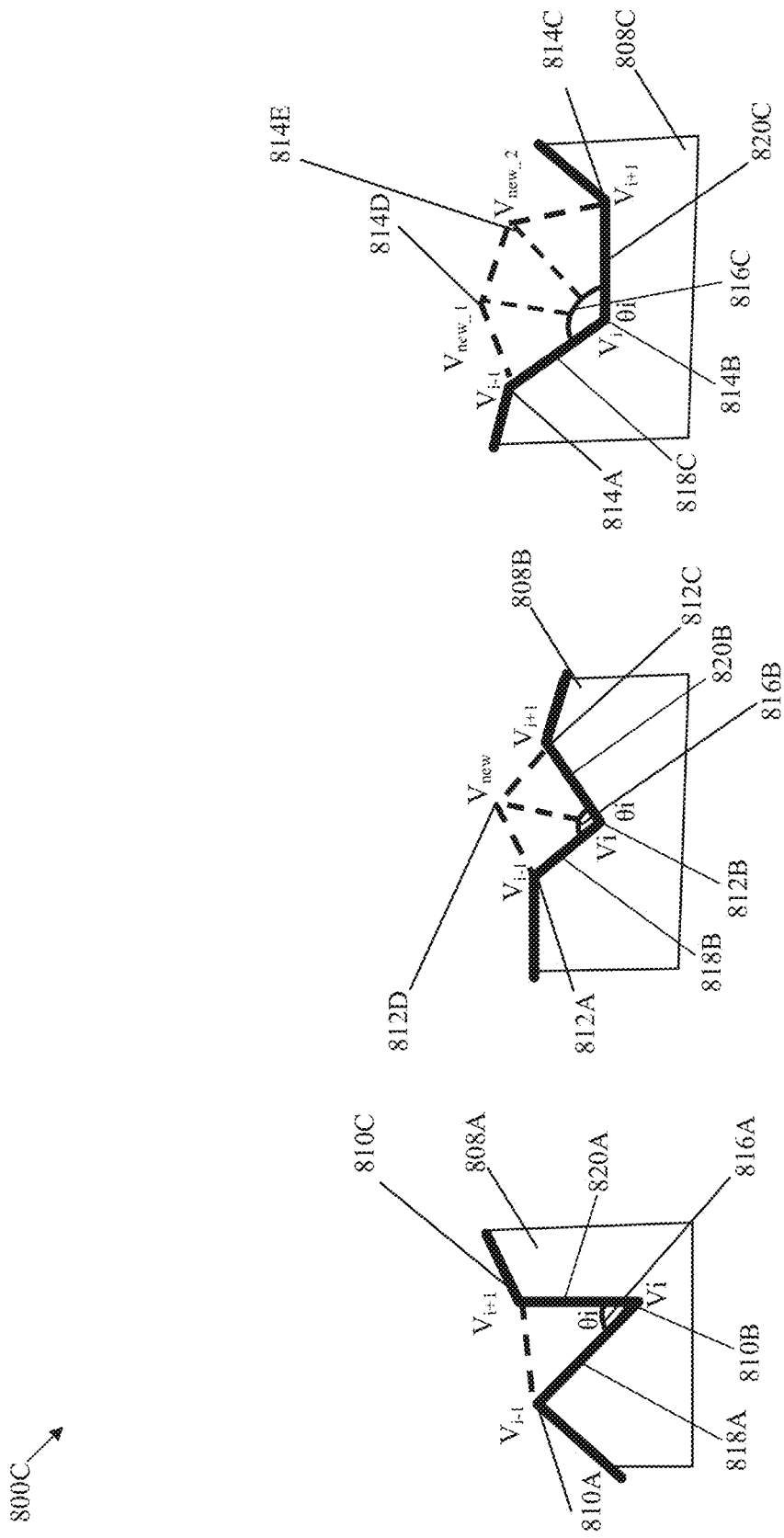

FIGS. 8A, 8B, and 8C are diagrams that illustrate filling of one or more first holes in a second 3D mesh, in accordance with an embodiment of the disclosure. FIGS. 8A, 8B, and 8C are described in conjunction with elements from FIGS. 1, 2, 3, 4, 5A, 5B, 5C, 6A, 6B, 6C, 7A, and 7B. With reference to FIG. 8A, there is shown a diagram 800A. The diagram 800A may include a second 3D mesh 802 of a head portion of an object (e.g., the object 110). The circuitry 202 may be configured to classify a set of holes in the second 3D mesh 802 (that may be generated from a first 3D mesh, e.g., the first 3D mesh 314). The set of holes in the second 3D mesh 802 may be classified into one or more first holes and one or more second holes. The number of vertices in the boundary of the one or more first holes may be below a threshold and the number of vertices in the boundary of the one or more second holes may be above a threshold. For example, the one or more first holes may be small holes with a boundary of less than 100 vertices and the one or more second holes may be large holes with a boundary of 100 or more vertices.

In an embodiment, the threshold associated with the number of vertices to classify the set of holes into the one or more first holes and the one or more second holes may be received as a user input from a user associated with the electronic device 102. As shown, for example, the diagram 800A includes a first region 804A that includes examples of the one or more first holes (e.g., small holes with a boundary of less than 100 vertices).

With reference to FIG. 8B, there is shown a diagram 800B. The diagram 800B may include a first expanded view 804B of the first region 804A, a second expanded view 804C of the first region 804A, and a third expanded view 804D of the first region 804A. The diagram 800B illustrates a progressive (or iterative) filling of the one or more first holes in the first region 804A through the first expanded view 804B, the second expanded view 804C, and the third expanded view 804D. For example, in FIG. 8B, there is shown a second region 806A in the first expanded view 804B, a third region 806B in the second expanded view 804C, and a fourth region 806C in the third expanded view 804D. The second region 806A includes one of the one or more first holes of the first region 804A. Based on execution of an iterative filling operation on the first hole of the second region 806A, the size of the first hole may be reduced. An example of the iteratively filled first hole of the second region 806A after a first iteration of the iterative filling operation is shown in the third region 806B of the second expanded view 804C. After another iteration of hole filling operation, the size of the first hole may reduce further. As an example, the first hole of the second region 806A may be completely filled based on the iterative reduction of the size of the first hole, as shown in the fourth region 806C of the third expanded view 806D. In an embodiment, the circuitry 202 may be configured to fill the one or more first holes (e.g., the one or more first holes in the first region 804A) in the second 3D mesh 802 based on a shape of boundary associated with each of the one or more first holes. The filling of the one or more first holes in the second 3D mesh is described further, for example, in FIG. 8C.

With reference to FIG. 8C, there is shown a diagram 800C. The diagram 800C illustrates a filling of the one or more first holes of the second 3D mesh 802. The diagram 800C may include one or more first holes of the second 3D mesh 802. The one or more first holes may include a first hole 808A, a second hole 808B, and a third hole 808C, for example. As shown in FIG. 8C, the first hole 808A may be a hole of a first type that may include a first vertex 810A (e.g., $v_{i-1}$), a second vertex 810B (e.g., $v_i$), and a third vertex 810C (e.g., $v_{i+1}$). The second vertex 810B may be an internal vertex of the first hole 808A. The first vertex 810A and the second vertex 810B may be associated with a first edge 818A between the first vertex 810A and the second vertex 810B. The second vertex 810B and the third vertex 810C may be associated with a second edge 820A between the second vertex 810B and the third vertex 810C. The first edge 818A and the second edge 820A may be adjoining edges that may be associated with a first internal angle 816A (e.g., $\theta_i$) between them at the second vertex 810B. The first internal angle 816A may be less than equal to 75°, for example.

The second hole 808B may be a hole of a second type that may include a first vertex 812A (e.g., $v_{i-1}$), a second vertex 812B (e.g., $v_i$), and a third vertex 812C (e.g., $v_{i+1}$). The second vertex 812B may be an internal vertex of the second hole 808B. The first vertex 812A and the second vertex 812B may be associated with a first edge 818B between the first vertex 812A and the second vertex 812B. The second vertex 812B and the third vertex 812C may be associated with a second edge 820B between the second vertex 812B and the third vertex 812C. The first edge 818B and the second edge 820B may be adjoining edges that may be associated with a second internal angle 816B (e.g., $\theta_i$) between them at the second vertex 812B. In an example, the second internal angle 816B may be greater than 75° and less than 135°.

The third hole 808C may be a hole of a third type that may include a first vertex 814A (e.g., $v_{i-1}$), a second vertex 814B (e.g., $v_i$), and a third vertex 814C (e.g., $v_{i+1}$). The second vertex 814B may be an internal vertex of the third hole 808C. The first vertex 814A and the second vertex 814B may be associated with a first edge 818C between the first vertex 814A and the second vertex 814B. The second vertex 814B and the third vertex 814C may be associated with a second edge 820C between the second vertex 814B and the third vertex 814C. The first edge 818C and the second edge 820C may be adjoining edges that may be associated with a third internal angle 816C (e.g., $\theta_i$) between them at the second vertex 814B. In an example, the third internal angle 816C may be greater than equal to 135°.

In an embodiment, to fill a certain hole (referred herein as a hole under consideration or a current hole) of the one or more first holes of the second 3D mesh 802, the circuitry 202 may be configured to determine an internal angle (e.g., the first internal angle 816A). The internal angle may be an angle between a pair of adjacent boundary edges (e.g., the first edge 818A and the second edge 820A) at an internal vertex (e.g., the second vertex 810B, i.e., $v_i$) of the current hole (e.g., the first hole 808A). Based on the determined internal angle, the circuitry 202 may determine a type of the current hole to be filled. For example, in case the internal angle is determined to be less than equal to 75°, the circuitry 202 may determine the current hole as a hole of the first type (i.e., a type same as that of the first hole 808A). If the internal angle is determined to be greater than 75° and less than 135°, then the type of the current hole may be determined as the second type (i.e., a type same as that of the second hole 808B). In case the internal angle is determined to be greater than or equal to 135°, then the type of the current hole may be determined as the third type (i.e., a type same as that of the third hole 808C).

In an embodiment, based on the determination of the type of the current hole, the circuitry 202 may create a set of facets between the first vertex (e.g., the first vertex 810A) and the third vertex (e.g., the second vertex 810B). To create the set of facets, the circuitry 202 may create a set of triangles on a plane determined by the first edge (e.g., the first edge 818A) and the second edge (e.g., the second edge 820A). For example, in case the current hole is of the first type, the circuitry 202 may create a new triangle by addition of an edge between the first vertex 810A (i.e., $v_{i-1}$) and the third vertex 810C (i.e., $v_{i+1}$), as shown with respect to the first hole 808A in FIG. 8C. The creation of the new triangle may create a new facet (denoted by that may fill the current hole. In case the current hole is of the second type, the circuitry 202 may create a new vertex (e.g., a fourth vertex 812D, i.e., $v_{new}$) between the first vertex 812A (i.e., $v_{i-1}$) and the third vertex 812C (i.e., $v_{i+1}$). The circuitry 202 may then create two triangles by addition of an edge between the first vertex 812A (i.e., $v_{i-1}$) and the fourth vertex 812D (i.e., $v_{new}$) and addition of another edge between the fourth vertex 812D (i.e., $v_{new}$) and the third vertex 812C (i.e., $v_{i+1}$), as shown with respect to the second hole 808B in FIG. 8C. The creation of two new triangles may create two new facets (denoted by $v_{i-1}$-$v_i$-$v_{new}$ and $v_{new}$-$v_i$-$v_{i+1}$) that may fill the current hole. In case the current hole is of the third type, the circuitry 202 may create a first new vertex (e.g., a fourth vertex 814D, i.e., $v_{new\_1}$) and a second new vertex (e.g., a fifth vertex 814E, i.e., $v_{new\_2}$) between the first vertex 814A (i.e., $v_{i-1}$) and the third vertex 814C (i.e., $v_{i+1}$). The circuitry 202 may then create three triangles by addition of edges between the first vertex 814A (i.e., $v_{i-1}$) and the fourth vertex 814D (i.e., $v_{new\_1}$), between the fourth vertex 814D (i.e., $v_{new\_1}$) and the fifth vertex 814E (i.e., $v_{new\_2}$), and between the fifth vertex 814E (i.e., $v_{new\_2}$) and the third vertex 814C (i.e., $v_{i+1}$), as shown with respect to the third hole 808C in FIG. 8C. The creation of three new triangles may create three new facets (denoted by $v_{i-1}$-$v_i$-$v_{new\_1}$, $v_{new\_1}$-$v_i$-$v_{new\_2}$, and $v_{new\_2}$-$v_i$-$v_{i+1}$) that may fill the current hole.

In an embodiment, the circuitry 202 may be configured to determine a distance between each newly created vertex (e.g., the fourth vertex 812D, i.e., $v_{new}$) and each boundary vertex (e.g., the first vertex 812A, i.e., $v_{i-1}$ and the third vertex 812C, i.e., $v_{i+1}$) associated with the newly created vertex. In case the distance between the newly created vertex and the boundary vertex is less than a certain threshold, then the newly created vertex may be merged with the boundary vertex. Until the one or more first holes of the second 3D mesh 802 is filled, the circuitry 202 may be configured to iteratively execute operations including, but not limited to, the determination of the internal angle, the determination of the type of the current hole, the creation of the set of facets, the determination of the distance, and the merger of the newly created vertex (in case the distance between the newly created vertex and the boundary vertex is less than the threshold). It should be noted that the diagrams 800A, 800B and 800C are for exemplary purpose and should not be construed as limiting the present disclosure.

Figure 9A:
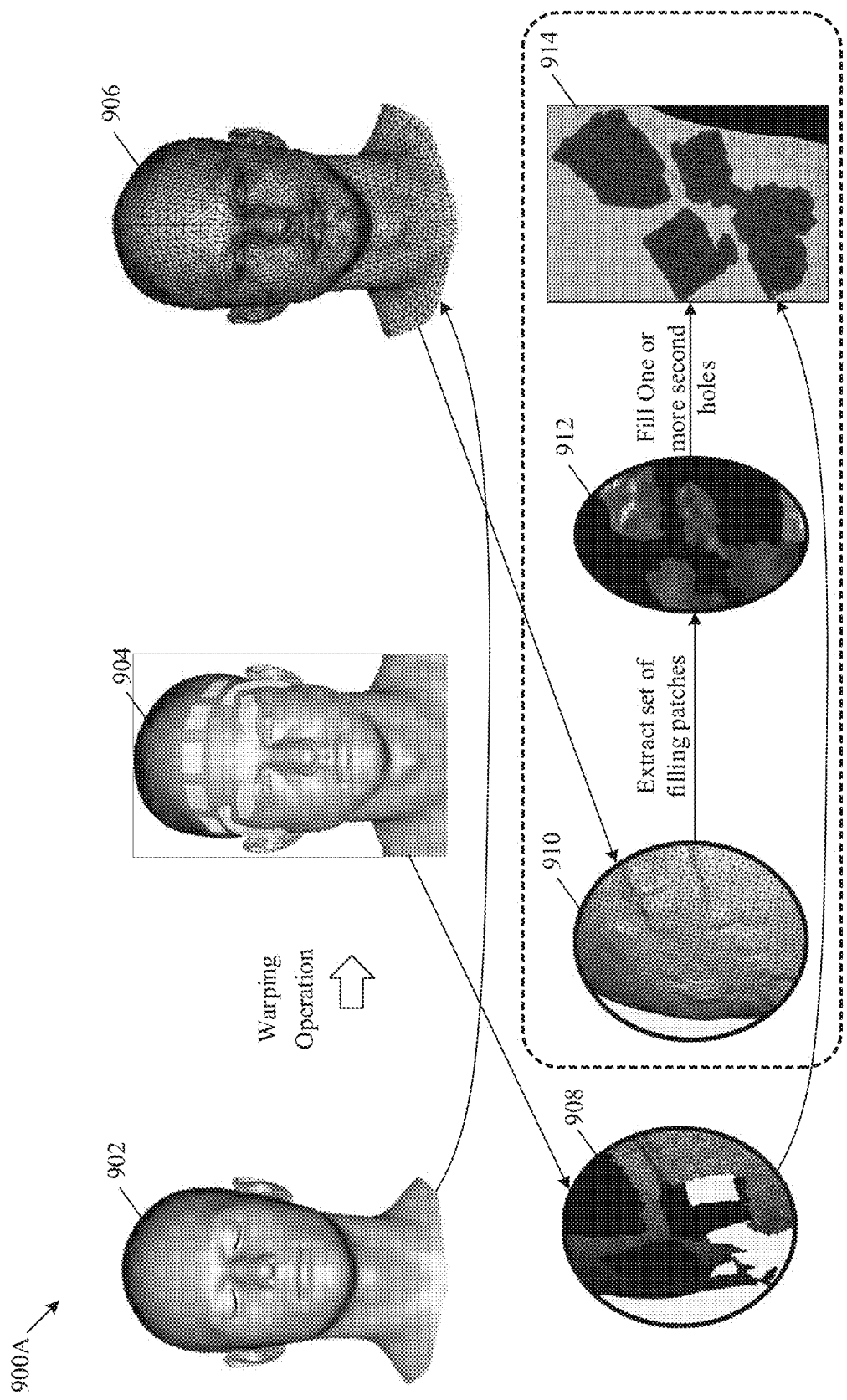
FIG. 9A is diagram that illustrates filling of one or more second holes in a second 3D mesh, in accordance with an embodiment of the disclosure.

FIG. 9A is diagram that illustrates filling of one or more second holes in a second 3D mesh, in accordance with an embodiment of the disclosure. FIG. 9A is described in conjunction with elements from FIGS. 1, 2, 3, 4, 5A, 5B, 5C, 6A, 6B, 6C, 7A, 7B, 8A, 8B, and 8C. With reference to FIG. 9A, there is shown a diagram 900A. The diagram 900A may include a 3D template mesh 902, a second 3D mesh 904, and a warped template mesh 906. The circuitry 202 may be configured to acquire the 3D template mesh 902. For example, the 3D template mesh 902 may be stored on the server 104. The server 104 may be configured to transmit the 3D template mesh 902 stored on the server 104, to the electronic device 102, via the communication network 108. In an embodiment, the circuitry 202 may acquire the 3D template mesh 902 from the server 104. In another scenario, the 3D template mesh 902 may be pre-stored in the memory 204. In such case, the circuitry 202 may acquire the 3D template mesh 902 from the memory 204. The second 3D mesh 904 may be generated from a first 3D mesh (e.g., the first 3D mesh 314) of a head portion of an object (e.g., the object 110). The second 3D mesh 904 may include the set of holes including the one or more second holes that may have a boundary of 100 or more vertices of the second 3D mesh 904.

In an embodiment, the circuitry 202 may be configured to process the 3D template mesh 902 to determine a set of filling patches corresponding to the set of holes (e.g., including the one or more second holes) in the second 3D mesh 904. The processing of the 3D template mesh 902 may include execution of a first operation to warp, for a non-hole region of the second 3D mesh 904, the 3D template mesh 902 based on a shape of the second 3D mesh 904 to obtain a warped template mesh, such as, the warped template mesh 906. The processing of the 3D template mesh 902 may further include execution of a second operation to update the warped template mesh 906 with a first boundary corresponding to the warpage of the non-hole region of the second 3D mesh 904. An updated template mesh (shown in FIG. 9B, as an updated template mesh 916) may be obtained based on the update of the warped template mesh 906. By way of example, and not limitation, the first operation to warp the 3D template mesh 902 may be executed based on an application of a deformation transfer technique, as described in, Sumner, Robert W., and Jovan Popović, "Deformation transfer for triangle meshes", ACM Transactions on Graphics (TOG), 2004. For example, the deformation transfer technique may be a general mesh based technique that transfers deformations exhibited by a source mesh onto a different target mesh. The deformation transfer technique may transfer characteristics between meshes of different mesh structure (for example, based on number of vertices, number of triangles, and connectivity in a mesh).

The diagram 900A may further include a first region 908 of the second 3D mesh 904 including examples of the one or more second holes of the second 3D mesh 904. The diagram 900A may further include a second region 910 of the updated template mesh (not shown in FIG. 9A) obtained based on the update of the warped template mesh 906. The second region 910 may be aligned with and may correspond to the first region 908. The diagram 900A may further include a set of filling patches 912 that may be extracted from the second region 910. The circuitry 202 may be configured to execute, based on the second 3D mesh 904 and the extracted set of filling patches 912, a hole filling operation to generate a final 3D mesh. In an example, the diagram 900A shown in FIG. 9A includes a third region 914 that may correspond to both the first region 908 and the second region 910. The third region 914 may belong to the final 3D mesh (not shown in FIG. 9A). The generation of the final 3D mesh is described further, for example, in FIGS. 9B, 10A, 10B, 11A, 11B, 12A, 12B, 12C, 13, 14, and 15. It should be noted that the diagram 900A is for exemplary purpose and should not be construed as limiting the present disclosure.

Figure 9B:
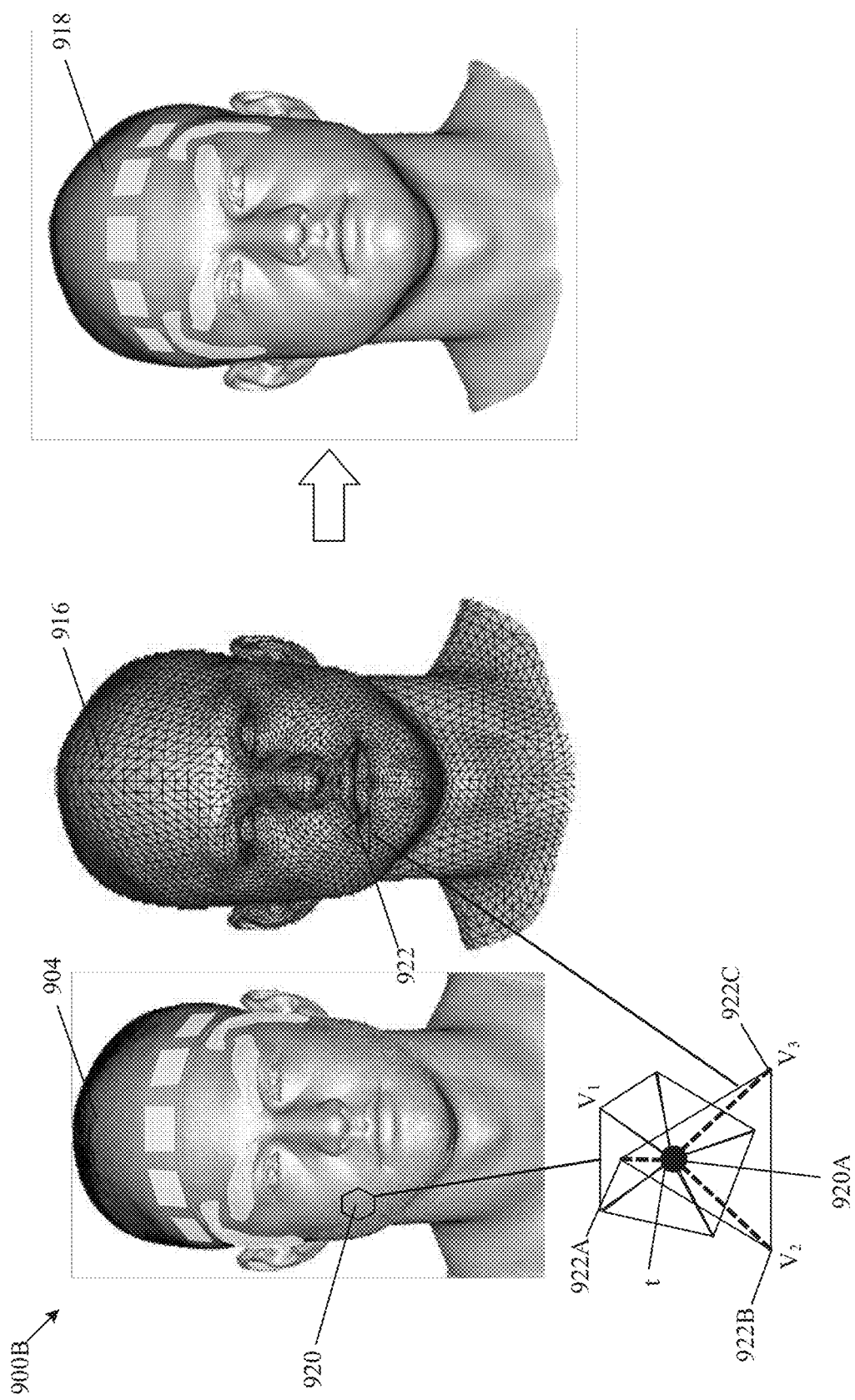
FIG. 9B is diagram that illustrates projection of a second 3D mesh to an updated template mesh to obtain a projected 3D mesh, in accordance with an embodiment of the disclosure.

FIG. 9B is diagram that illustrates projection of a second 3D mesh to an updated template mesh to obtain a projected 3D mesh, in accordance with an embodiment of the disclosure. FIG. 9B is described in conjunction with elements from FIGS. 1, 2, 3, 4, 5A, 5B, 5C, 6A, 6B, 6C, 7A, 7B, 8A, 8B, 8C, and 9A. With reference to FIG. 9B, there is shown a diagram 900B. The diagram 900B may include the second 3D mesh 904, an updated template mesh 916 (also hereinafter referred as an updated warped template mesh 916), and a projected 3D mesh 918. The updated template mesh 916 may be obtained based on the update of the warped template mesh 906, as described further, for example, in FIG. 9A.

In an embodiment, the processing of the 3D template mesh 902 may include execution of a mesh retopology operation. The mesh retopology operation may include a projection of the second 3D mesh 904 to the updated template mesh 916 so as to obtain the projected 3D mesh 918. In an embodiment, the updated template mesh 916 may be a lower poly mesh as compared to the second 3D mesh 904 (which may be a higher poly mesh).

To project the second 3D mesh 904 to the updated template mesh 916, the circuitry 202 may be configured to estimate a nearest surface from a low poly mesh of the updated template mesh 916 for each vertex of the second 3D mesh 904 of a high poly mesh. The circuitry 202 may represent a vertex of the second 3D mesh 904 based on Barycentric co-ordinates of the corresponding estimated surface of the updated template mesh 916. For example, the diagram 900B may further include a pentagon 920 (including five triangles of a high poly mesh) of the second 3D mesh 904 and a triangle 922 (i.e., a single triangle of a low poly mesh) of the updated template mesh 916. The pentagon 920 of the second 3D mesh 904 may correspond to the triangle 922 of the updated template mesh 916. In FIG. 9B, there is shown a vertex 920A (denoted by "t") of the pentagon 920 of the second 3D mesh 904. In an embodiment, the vertex 920A (denoted by "t") may a shared vertex of five triangles included in the pentagon 920, as shown in FIG. 9B. The vertex 920A (denoted by "t") may be a centroid of the pentagon 920, for example. Further, there are shown vertices, such as a first vertex 922A (denoted by "$v_1$"), a second vertex 922B (denoted by "$v_2$"), and a third vertex 922C (denoted by "$v_3$"). The Barycentric co-ordinates of the centroid vertex 920A (denoted by "t") in terms of the first vertex 922A (denoted by "$v_1$"), the second vertex 922B (denoted by "$v_2$"), and the third vertex 922C (denoted by "$v_3$") may be represented by equation (3), as follows:

$$t = b_1 v_1 + b_2 v_2 + (1 - b_1 - b_2) v_3 \quad (3)$$

where each of b1 and b2 may represent weights associated with vertices of the updated template mesh 916.

In an embodiment, the projected 3D mesh 918 may have a shape that may be same as the updated template mesh 916. Also, the projected 3D mesh 918 may have a topology that may be same as the second 3D mesh 904. The shape and topology related characteristics of the projected 3D mesh 918 may be useful for the mesh retopology operation. The mesh retopology operation is described further, for example, in FIGS. 10A, 10B, 11A, and 11B. It should be noted that the diagram 900B is for exemplary purpose and should not be construed as limiting the present disclosure.

Figure 10A:
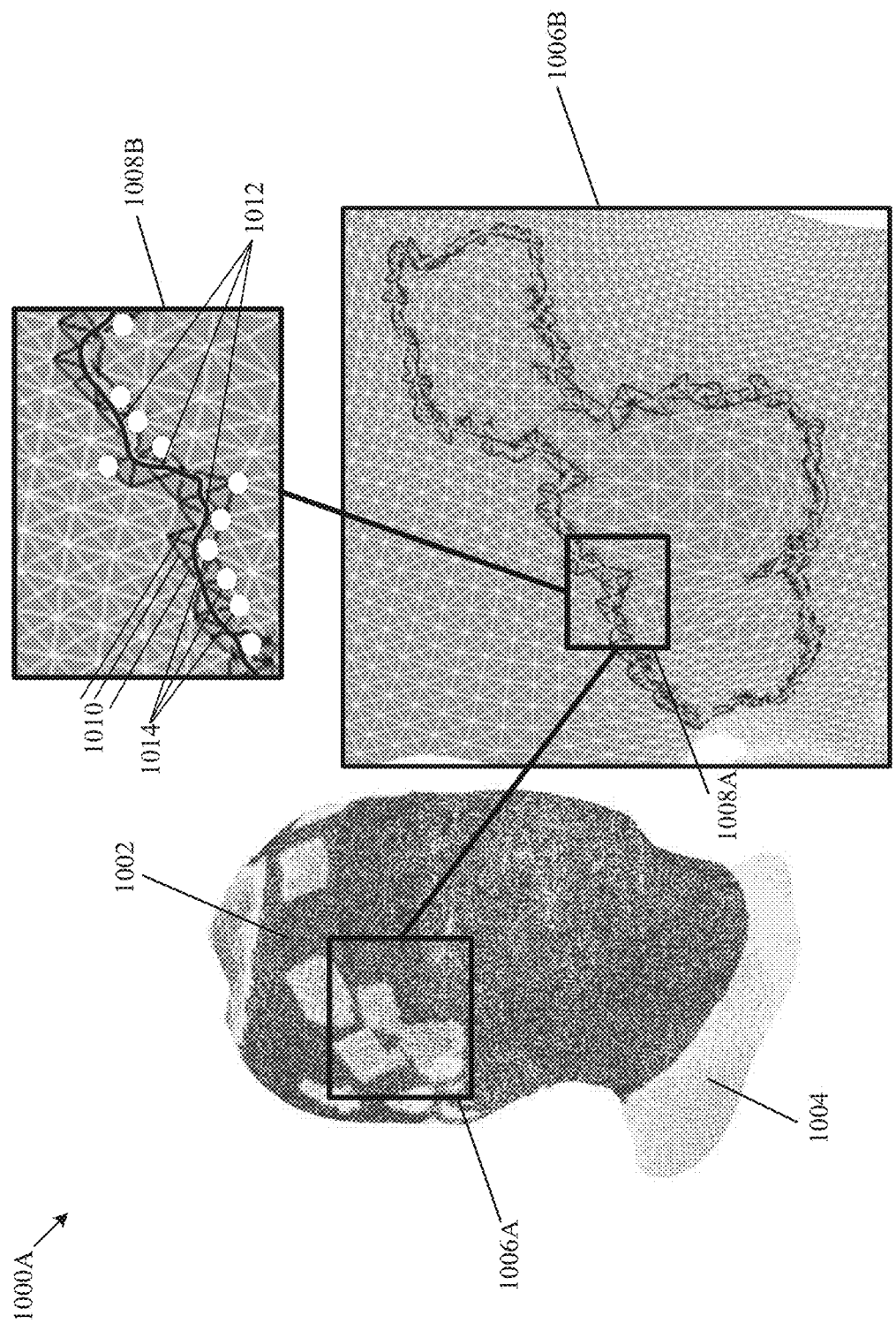
FIG. 10A is diagram that illustrates determination of a set of candidate vertices to be connected to obtain a boundary of a filling patch, in accordance with an embodiment of the disclosure.

FIG. 10A is diagram that illustrates determination of a set of candidate vertices to be connected to obtain a boundary of a filling patch, in accordance with an embodiment of the disclosure. FIG. 10A is described in conjunction with elements from FIGS. 1, 2, 3, 4, 5A, 5B, 5C, 6A, 6B, 6C, 7A, 7B, 8A, 8B, 8C, 9A, and 9B. With reference to FIG. 10A, there is shown a diagram 1000A. The diagram 1000A may include a projected 3D mesh 1002 that may be similar to the projected 3D mesh 918 of FIG. 9B. The projected 3D mesh 1002 may include one or more portions corresponding to the updated template mesh 916 of FIG. 9B. For example, the one or more portions corresponding to the updated template mesh 916 may include a first portion 1004. The projected 3D mesh 1002 may further include a first region 1006A that may correspond to the set of holes (e.g., the one or more second holes) of the second 3D mesh 904. The diagram 1000A may further include a first expanded view 1006B of the first region 1006A. The first expanded view 1006B may include a second region 1008A included in the first region 1006A. The diagram 1000A may further include a second expanded view 1008B of the second region 1008A.

In an embodiment, the mesh retopology operation may further include a determination of a set of triangles from the updated template mesh 916. The set of triangles may be associated with a first set of vertices at the first boundary corresponding to the warpage of the non-hole region of the second 3D mesh 904. For example, in the second expanded view 1008B of the second region 1008A, there is shown a set of triangles 1010 associated with the first set of vertices at the first boundary. There is further shown the first set of vertices (such as a first line 1012) at the first boundary corresponding to the warpage of the non-hole region of the second 3D mesh 904.

In an embodiment, the mesh retopology operation may further include a determination of a set of candidate vertices associated with the determined set of triangles (e.g., the set of triangles 1010), based on the second 3D mesh 904. For example, the circuitry 202 may identify those vertices from the determined set of triangles that may not be inferred by (or correspond to) the second 3D mesh 904. Such identified vertices may be determined as the set of candidate vertices. For example, a set of candidate vertices 1014 is shown in FIG. 10A. The determined set of candidate vertices (e.g., the set of candidate vertices 1014) may be connected to obtain a boundary of a filling patch. The determination of a filling patch is described further, for example, in FIG. 10B. It should be noted that the diagram 1000A is for exemplary purpose and should not be construed as limiting the present disclosure.

Figure 10B:
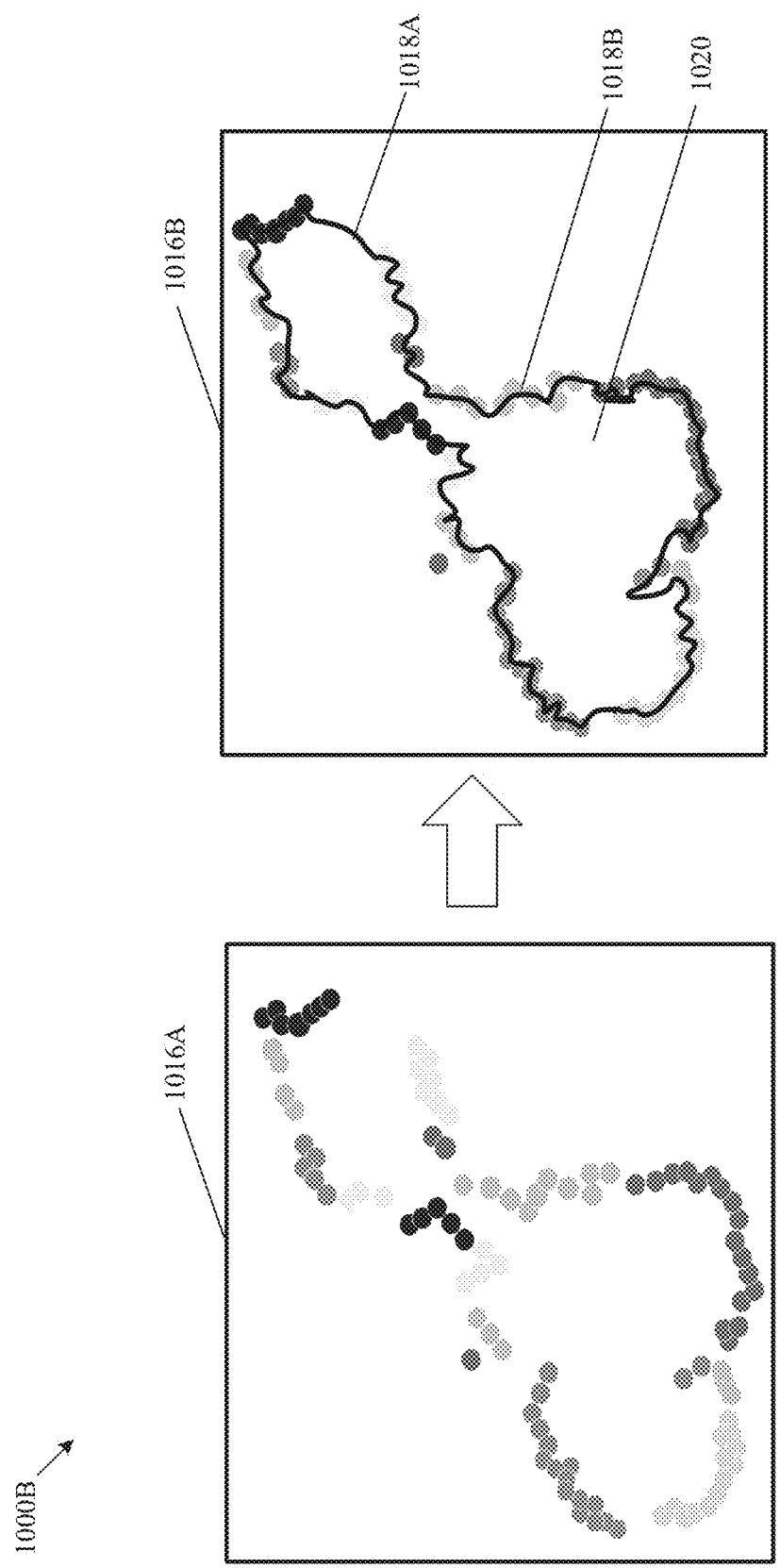
FIG. 10B is diagram that illustrates determination of a filling patch, in accordance with an embodiment of the disclosure.

FIG. 10B is diagram that illustrates determination of a filling patch, in accordance with an embodiment of the disclosure. FIG. 10B is described in conjunction with elements from FIGS. 1, 2, 3, 4, 5A, 5B, 5C, 6A, 6B, 6C, 7A, 7B, 8A, 8B, 8C, 9A, 9B, and 10A. With reference to FIG. 10B, there is shown a diagram 1000B. The diagram 1000B may include a first expanded view 1016A of the first region 1006A (of the projected 3D mesh 1002). The first region 1006A may correspond to the set of holes (e.g., the one or more second holes) of the second 3D mesh 904. The first expanded view 1016A may be a view that may depict the first region 1006A similar to the depiction of the first region 1006A in the first expanded view 1006B of the first region 1006A. The diagram 1000B may further include a second expanded view 1016B of the first region 1006A. The second expanded view 1016B may be obtained from the first expanded view 1006B after a determination of a first filling patch from the first region 1006A.

In an embodiment, the mesh retopology operation may further include connection of the determined set of candidate vertices (e.g., the set of candidate vertices 1014) to obtain a second boundary of the first filling patch of the set of filling patches (e.g., the set of filling patches 912). For example, the circuitry 202 may group the set of candidate vertices based on a connectivity associated with the set of candidate vertices. A pair of candidate vertices from the set of candidate vertices may be determined as connected if there exists an edge between the pair of candidate vertices and a position on the edge may not be referred by or may not correspond to the second 3D mesh 904. A connected region may include a group of vertices such that there exists a path between any two vertices in the group. Herein, a path inside a connected region may be such that the path may be connected by edges that may not referred by or may not correspond to the second 3D mesh 904. The circuitry 202 may search a path between two connected regions to find a path between two vertices, from two different connected regions. The path between the two connected regions may traverse the two connected regions. However, such a path may not be referred by or may not correspond to (or related to) the second 3D mesh 904. Further, the circuitry 202 may search a path in a same connected region. For example, a first path 1018A may be identified between two connected regions and a second path 1018B may be identified in same connected region. In an embodiment, the mesh retopology operation may further include a determination of the first filling patch based on the obtained second boundary of the first filling patch. For example, the circuitry 202 may extract a region enclosed within the second boundary of the first filling patch to determine the first filling patch, such as, a first filling patch 1020. It should be noted that the diagram 1000B is for exemplary purpose and should not be construed as limiting the present disclosure.

Figure 11A:
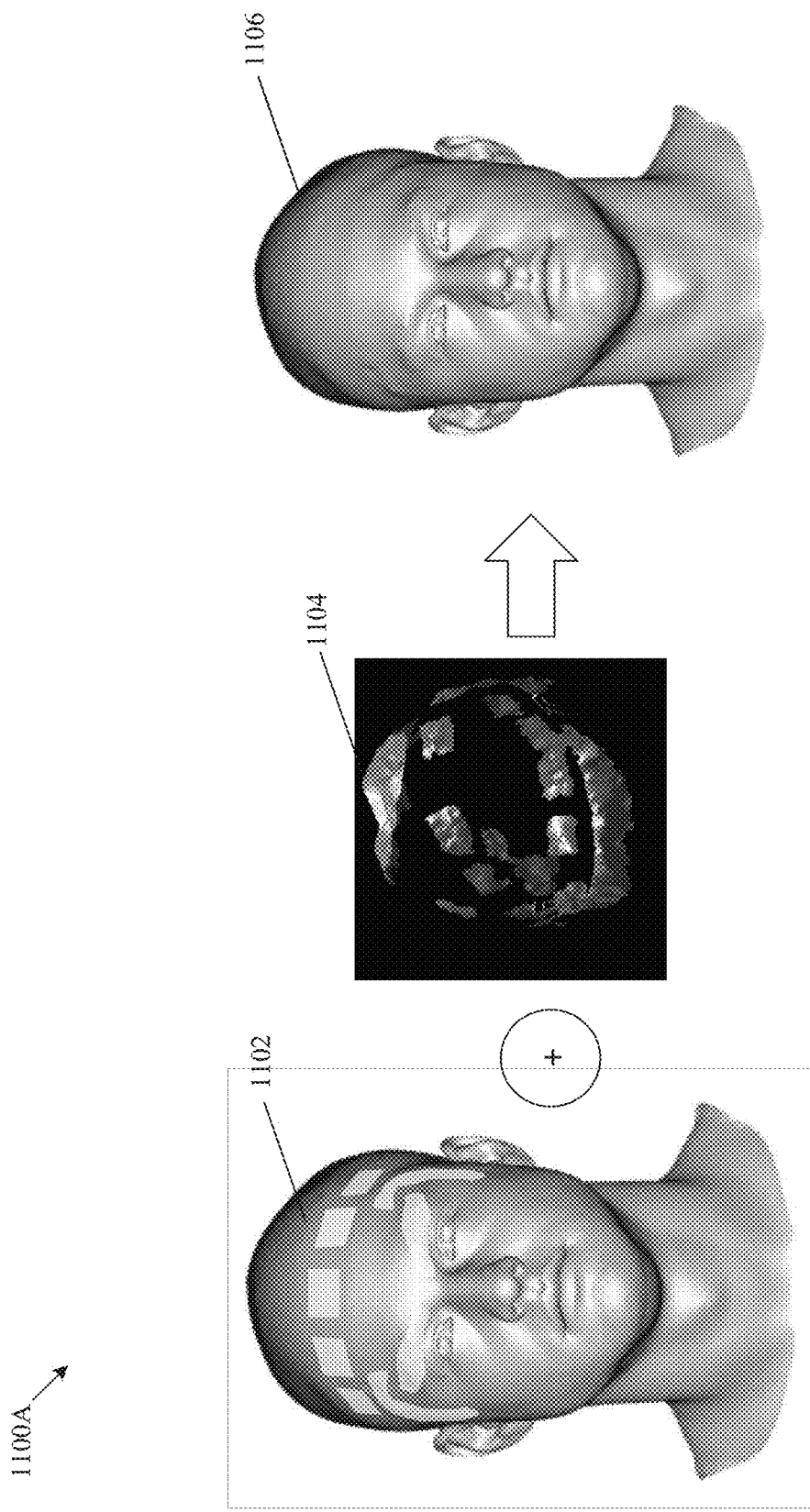
FIGS. 11A and 11B are diagrams that illustrate execution of a hole filling operation, in accordance with an embodiment of the disclosure.
Figure 11B:
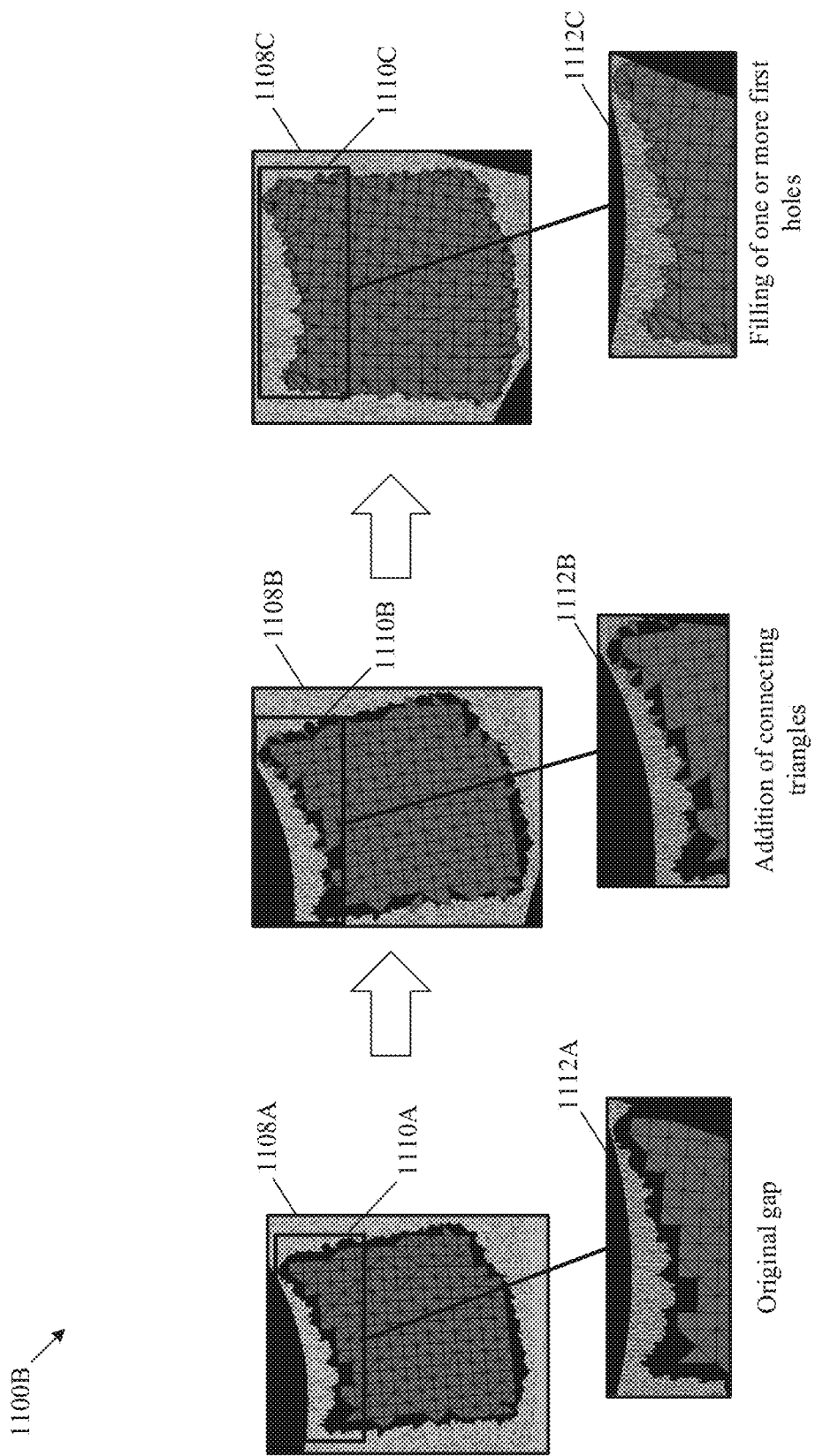

FIGS. 11A and 11B are diagrams that illustrate execution of a hole filling operation, in accordance with an embodiment of the disclosure. FIGS. 11A and 11B are described in conjunction with elements from FIGS. 1, 2, 3, 4, 5A, 5B, 5C, 6A, 6B, 6C, 7A, 7B, 8A, 8B, 8C, 9A 9B, 10A, and 10B. With reference to FIG. 11A, there is shown a diagram 1100A. The diagram 1100A may include a projected 3D mesh 1102, a set of filling patches 1104, and a re-topologized 3D mesh 1106. For example, the projected 3D mesh 1102 may be similar to the projected 3D mesh 918 of FIG. 9B. In an example, the set of filling patches 1104 may include the first filling patch 1020. The determination of the first filling patch 1020 is described further, for example, in FIGS. 10A and 10B.

In an embodiment, the execution of the hole filling operation may include a combination of the set of filling patches 1104 with the projected 3D mesh 1102 to obtain a connected mesh (not shown in FIG. 11A). In an embodiment, the execution of the hole filling operation may further include a filling-up of gaps between connecting parts of the connected mesh to obtain a re-topologized 3D mesh, such as the re-topologized 3D mesh 1106. A connecting part may include a filling patch and a corresponding hole region of the projected 3D mesh 1102. The filling-up of the gaps is described further, for example, in FIG. 11B. It should be noted that the diagram 1100A is for exemplary purpose and should not be construed as limiting the present disclosure.

With reference to FIG. 11B, there is shown a diagram 1100B. The diagram 1100B may include a first region 1108A of the connected mesh (not shown in FIG. 11A). The first region 1108A may include a first connecting part of the connected mesh. For example, the first connecting part may include a combination of a first filling patch with a corresponding first hole region in the projected 3D mesh 1102. The first connecting part may further include a first set of gaps left based on a combination between the first filling patch and the corresponding first hole region.

In FIG. 11B, there is shown a first portion 1110A of the first connecting part and a first expanded view 1112A of the first portion 1110A. The circuitry 202 may add triangles to connect the first set of gaps of the first connecting part. By addition of the connecting triangles, vertices that may be more than a threshold distance apart from each other in the connected mesh may be avoided. Further, the addition of the connecting triangles may reduce each of the first set of gaps and convert such gaps into a first set of holes with a boundary in loop. In an example, the first set of holes may be small holes with a boundary of less than 100 vertices. The diagram 1100B may include a second region 1108B that may be obtained from the first region 1108A based on the addition of the connecting triangles.

FIG. 11B further shows a second portion 1110B (of the second region 1108B) that may be obtained from the first portion 1110A based on the addition of the connecting triangles. Also, there is shown a second expanded view 1112B of the second portion 1110B. As discussed in the aforementioned, the first set of gaps of the first connecting part may be converted into the first set of holes based on the addition of the connecting triangles.

In an embodiment, the circuitry 202 may be configured to fill the first set of holes, after the addition of the connecting triangles. For example, the diagram 1100B further includes a third region 1108C that may be obtained from the second region 1108B based on the filling of the first set of holes in the first connecting part. The third region 1108C may include a third portion 1110C that may be obtained from the second portion 1110B, based on the filling of the first set of holes in the first connecting part. Also, there is shown a third expanded view 1112C of the third portion 1110C. The filling-up of the gaps is described further, for example, in FIGS. 12A, 12B, and 12C. It should be noted that the diagram 1100B is for exemplary purpose and should not be construed as limiting the present disclosure.

Figure 12A:
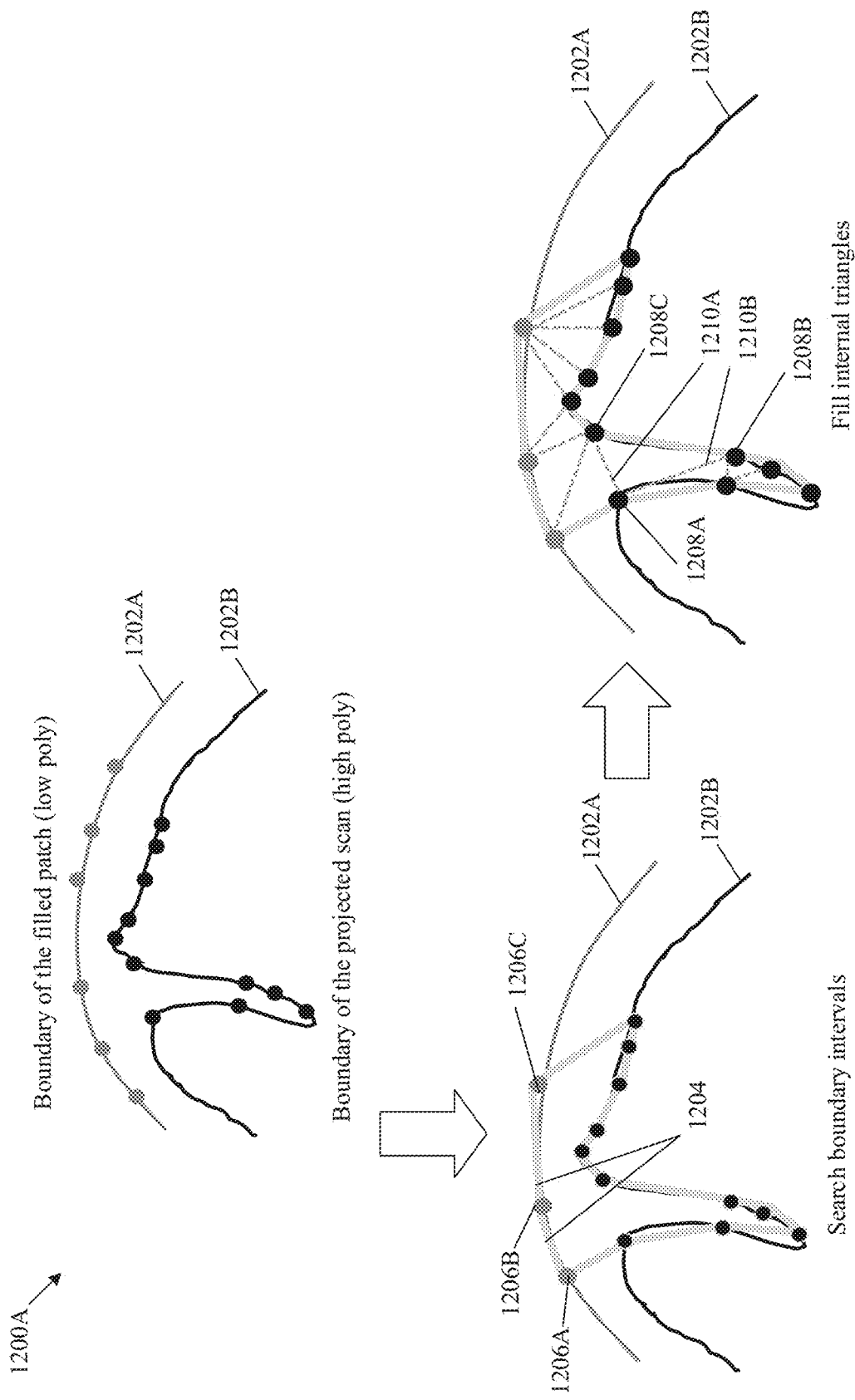
FIGS. 12A, 12B, and 12C are diagrams that illustrate filling-up of gaps between connecting parts of a connected mesh, in accordance with an embodiment of the disclosure.
Figure 12B:
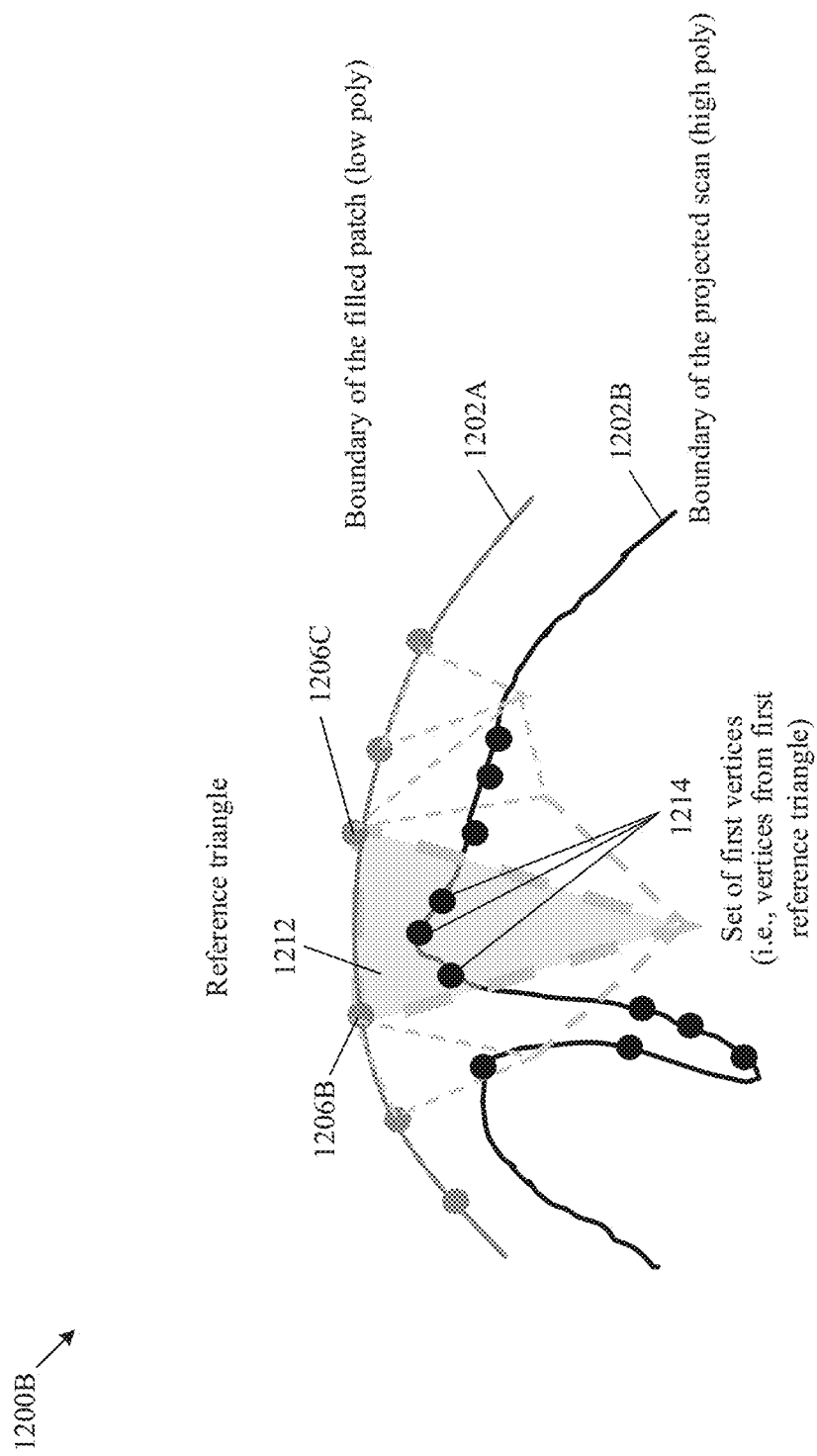
Figure 12C:
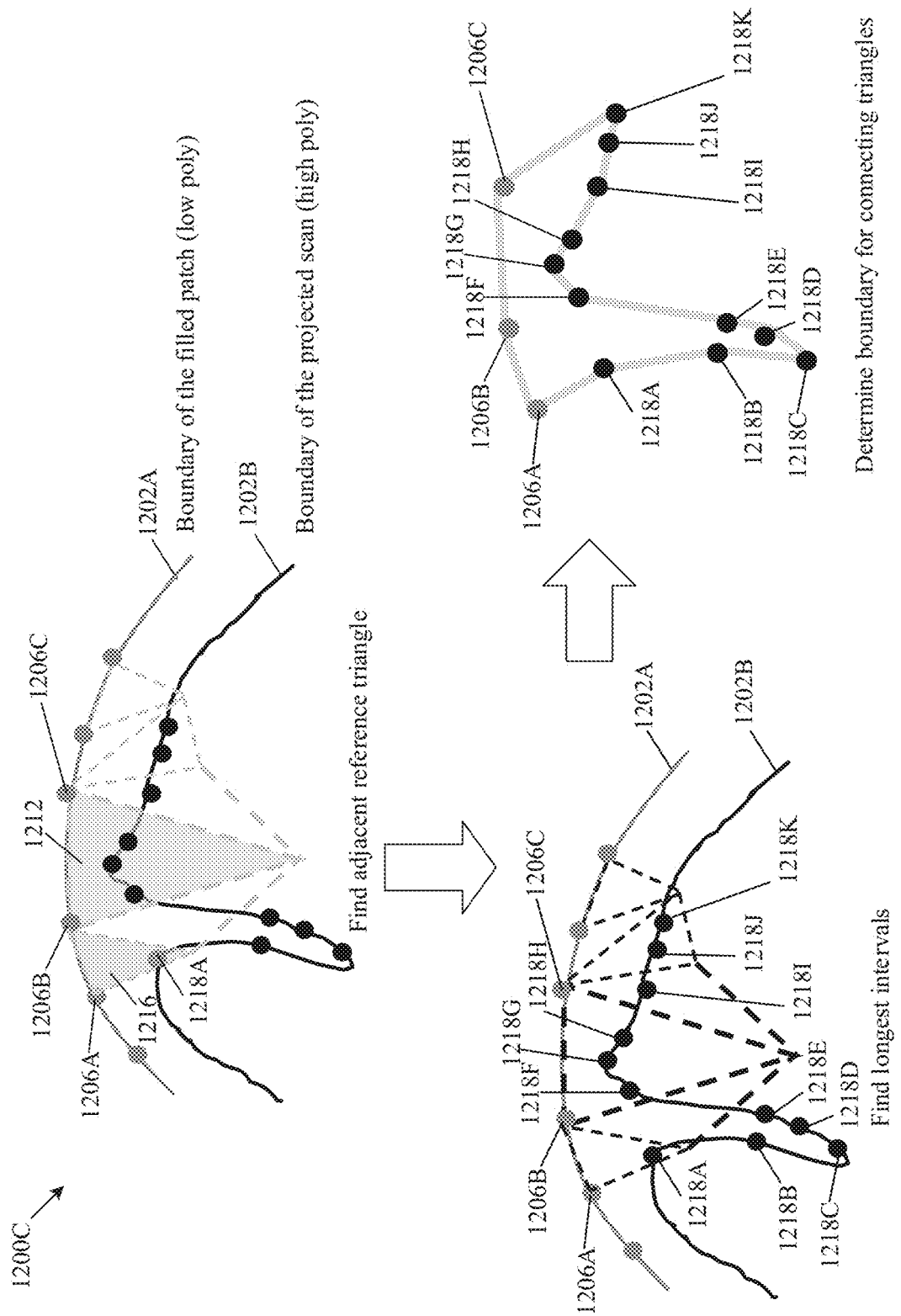

FIGS. 12A, 12B, and 12C are diagrams that illustrate filling-up of gaps between connecting parts of a connected mesh, in accordance with an embodiment of the disclosure. FIGS. 12A, 12B, and 12C are described in conjunction with elements from FIGS. 1, 2, 3, 4, 5A, 5B, 5C, 6A, 6B, 6C, 7A, 7B, 8A, 8B, 8C, 9A 9B, 10A, 10B, 11A, and 11B. With reference to FIG. 12A, there is shown a diagram 1200A. The diagram 1200A may include a first boundary 1202A and a second boundary 1202B. The first boundary 1202A may be a boundary of a first filling patch of the set of filling patches 1104. The second boundary 1202B may be a boundary of a first hole region of the projected 3D mesh 1102. The first filling patch may correspond to the first hole region. In an embodiment, the first filling patch may be a part of a low poly mesh, while the projected 3D mesh 1102 may be a high poly mesh. The connected mesh may include connecting parts. As an example, the connected parts of the connected mesh may include, but is not limited to, the first boundary 1202A associated with the first filling patch and the second boundary 1202B associated with the first hole region. The connected mesh may include gaps between the connected parts. The filling-up of the gaps is described next.

In an embodiment, the circuitry 202 may be configured to determine a set of adjacent boundary intervals (e.g., a set of adjacent boundary intervals 1204, shown in FIG. 12A) based on the projected 3D mesh 1102 and the set of filling patches 1104 (included in the connected mesh). For example, the diagram 1200A may further include the set of adjacent boundary intervals 1204, a first boundary vertex 1206A, a second boundary vertex 1206B, and a third boundary vertex 1206C. The first boundary vertex 1206A, the second boundary vertex 1206B, and the third boundary vertex 1206C may lie on the first boundary 1202A of the first filling patch. In an example, the set of adjacent boundary intervals 1204 may include a first boundary interval between the first boundary vertex 1206A and the second boundary vertex 1206B, and may include a second boundary interval between the second boundary vertex 1206B and the third boundary vertex 1206C. The first boundary interval and the second boundary interval may be adjacent to each other. The determination of the set of adjacent boundary intervals is described further, for example, in FIGS. 12B and 12C.

In an embodiment, the circuitry 202 may be configured to connect the determined set of adjacent boundary intervals (e.g., set of adjacent boundary intervals 1204) in a pairwise manner to fill-up the gaps with triangles. For the filling-up of the gaps, the boundary of the first hole region of the projected 3D mesh 1102 may be determined by the set of adjacent boundary intervals 1204. For example, the diagram 1200A further includes a first vertex 1208A, a second vertex 1208B, and a third vertex 1208C, each of which may lie on the second boundary 1202B. The diagram 1200A may further include a first edge 1210A and a second edge 1210B. The first edge 1210A (between the first vertex 1208A and the second vertex 1208B) and the second edge 1210B (between the first vertex 1208A and the third vertex 1208C) may be created to connect the set of adjacent boundary intervals 1204 in a pairwise manner and fill-up the gaps with triangles (such as, an internal triangle formed from the vertices 1208A, 1208B, and 1208C). The filling-up of the gaps is described further, for example, in FIGS. 12B and 12C.

With reference to FIG. 12B, there is shown a diagram 1200B. The diagram 1200B may include the first boundary 1202A, the second boundary 1202B, the second boundary vertex 1206B, the third boundary vertex 1206C, a first reference triangle 1212, and a set of first vertices 1214 (i.e., vertices from the first reference triangle 1212). The determination of the set of adjacent boundary intervals (e.g., the set of adjacent boundary intervals 1204, shown in FIG. 12A) may include a first operation and a second operation. The first operation may include a determination of a set of reference triangles of the updated template mesh 916 onto which the second boundary 1202B of the projected 3D mesh 1102 may be projected on. For a reference triangle selected from the set of reference triangles, the first operation may further include a determination of boundary vertices (i.e., vertices that may lie on the second boundary 1202B) of the projected 3D mesh 1102, such that the boundary vertices may be associated with the selected reference triangle. For example, for the first reference triangle 1212, the set of first vertices 1214 may be determined as boundary vertices that may lie on the second boundary 1202B and may be associated with the first reference triangle 1212. The first operation may further include a determination of vertices of the selected reference triangle that may lie on the first boundary 1202A of the first filling patch. The vertices of the selected reference triangle that may lie on the first boundary 1202A of the filling patch may be determined because the first boundary 1202A of the first filling patch may be searched by use of such reference triangles. For example, the second boundary vertex 1206B and the third boundary vertex 1206C may be determined as vertices of the first reference triangle 1212 that may lie on the first boundary 1202A. The determination of the set of adjacent boundary intervals is described further, for example, in FIG. 12C.

With reference to FIG. 12C, there is shown a diagram 1200C. The diagram 1200C may include the first boundary 1202A, the second boundary 1202B, the first boundary vertex 1206A, the second boundary vertex 1206B, the third boundary vertex 1206C, the first reference triangle 1212, a second reference triangle 1216, and a set of second vertices (i.e., vertices (such as, a first vertex 1218A) from the second reference triangle 1216). The diagram 1200C may further include a second vertex 1218B, a third vertex 1218C, a fourth vertex 1218D, a fifth vertex 1218E, a sixth vertex 1218F, a seventh vertex 1218G, an eighth vertex 1218H, a ninth vertex 1218I, a tenth vertex 1218J, an eleventh vertex 1218K. In an embodiment, the second operation (of the determination of the set of adjacent boundary intervals) may include a determination of a reference triangle that may have a common boundary vertex with the selected reference triangle (e.g., the first reference triangle 1212) of the first operation. For example, the second reference triangle 1216 may be determined as the reference triangle that may have a common boundary vertex (e.g., the second boundary vertex 1206B) with the first reference triangle 1212. The determination of the set of adjacent boundary intervals may further include an execution of another iteration of the first operation and the second operation until a reference triangle continues to be identified in the second operation.

Based on the iterations of the first operation and the second operations, the longest boundary interval that may include all vertices extracted from each iteration may be identified, as shown in FIG. 12C. The vertices may be extracted from both the first boundary 1202A and the second boundary 1202B. The circuitry 202 may be configured to continue the search for the longest boundary interval for an entire gap region between the first filling patch and the corresponding first hole region of the projected 3D mesh 1102.

The circuitry 202 may be configured to determine a boundary for connecting triangles based on the longest boundary interval. For example, as shown in FIG. 12C, the boundary for the connecting triangles may be determined as a set of line segments that may connect the first boundary vertex 1206A, the first vertex 1218A, the second vertex 1218B, the third vertex 1218C, the fourth vertex 1218D, the fifth vertex 1218E, the sixth vertex 1218F, the seventh vertex 1218G, the eighth vertex 1218H, the ninth vertex 1218I, the tenth vertex 1218J, the eleventh vertex 1218K, the third boundary vertex 1206C, and the second boundary vertex 1206B. The circuitry 202 may be further configured to connect the determined set of adjacent boundary intervals in a pairwise manner to fill-up the gaps with triangles. The connection of the determined set of adjacent boundary intervals is described further, for example, in FIG. 13.

It should be noted that the diagram 1200A, 1200B, and 1200C are for exemplary purpose and should not be construed as limiting the present disclosure.

Figure 13:
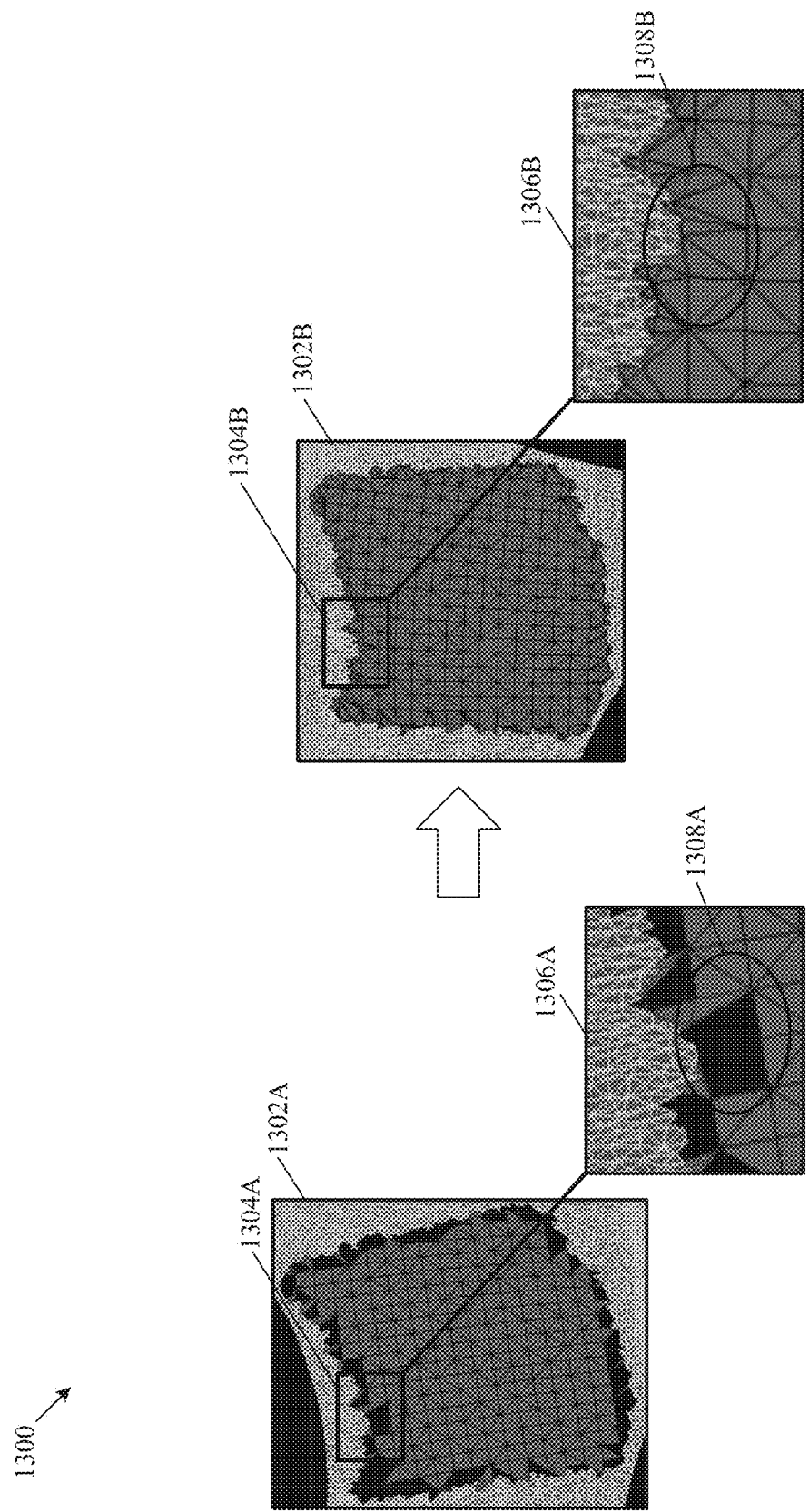
FIG. 13 is a diagram that illustrates filling-up of gaps between connecting parts of a connected mesh to obtain a re-topologized 3D mesh, in accordance with an embodiment of the disclosure.

FIG. 13 is a diagram that illustrates filling-up of gaps between connecting parts of a connected mesh to obtain a re-topologized 3D mesh, in accordance with an embodiment of the disclosure. FIG. 13 is described in conjunction with elements from FIGS. 1, 2, 3, 4, 5A, 5B, 5C, 6A, 6B, 6C, 7A, 7B, 8A, 8B, 8C, 9A 9B, 10A, 10B, 11A, 11B, 12A, 12B, and 12C. With reference to FIG. 13, there is shown a diagram 1300. The diagram 1300 may include a first region 1302A of a connected mesh (not shown in FIG. 13). The first region 1302A may include a first connecting part of the connected mesh. For example, the first connecting part may include a combination of a first filling patch with a corresponding first hole region in the projected 3D mesh 1102. The first connecting part may further include a first set of gaps left in the connected mesh between the first filling patch and the corresponding first hole region.

In FIG. 13, there is shown a first portion 1304A of the first connecting part and a first expanded view 1306A of the first portion 1304A. The circuitry 202 may add triangles to connect the first set of gaps of the first connecting part. For example, the determined set of adjacent boundary intervals 1204 (as shown in FIGS. 12A and 12C) may be connected in a pairwise manner to fill-up the gaps with the triangles. The addition of the connecting triangles may avoid vertices that may be farther than a threshold distance away from each other to be connected to each other. Further, the addition of the connecting triangles may reduce each of the first set of gaps and may convert such gaps into a first set of holes with a boundary in loop. In an example, the first set of holes may be small holes with a boundary of less than 100 vertices. The first region 1302A may be obtained from a corresponding region in the connected mesh, based on the addition of the connecting triangles. The addition of the connecting triangles may connect the set of filling patches 1104 and the projected 3D mesh 1102.

In an embodiment, the circuitry 202 may be configured to fill the first set of holes, after the addition of the connecting triangles. For example, the diagram 1300 may further include a second region 1302B that may be obtained from the first region 1302A, based on the filled first set of holes in the first connecting part in the first region 1302A, after the addition of the connecting triangles. The second region 1302B may include a second portion 1304B that may be obtained from the first portion 1304A of the first region 1302A, based on the filling of the first set of holes in the first connecting part in the first region 1302A, after the addition of the connecting triangles.

There is further shown a second expanded view 1306B of the second portion 1304B. The second region 1302B may be a region of the re-topologized 3D mesh 1106 and may correspond to the first region 1302A of the connected mesh. In an embodiment, the first set of holes may be filled in a manner similar to the filling of the one or more first holes, as described, for example, in FIGS. 8A, 8B, and 8C. In another embodiment, the filling of the first set of holes may be similar to the filling of the one or more first holes (as in aforementioned), however, with a variation. For example, the first set of holes may be filled without addition of any new vertices. This may help in application of a same re-topology as the 3D template mesh 902 on the second 3D mesh 904. The 3D template mesh 902 and the updated template mesh 916 may have the same topology. Thus, the same Barycentric co-ordinates may be used to project the second 3D mesh 904 to the 3D template mesh 902. Missing regions (or holes) of the updated template mesh 916 may not be accurate. The circuitry 202 may be configured to use filling patches from the 3D template mesh 902 to fill the holes to improve the accuracy.

Figure 14:
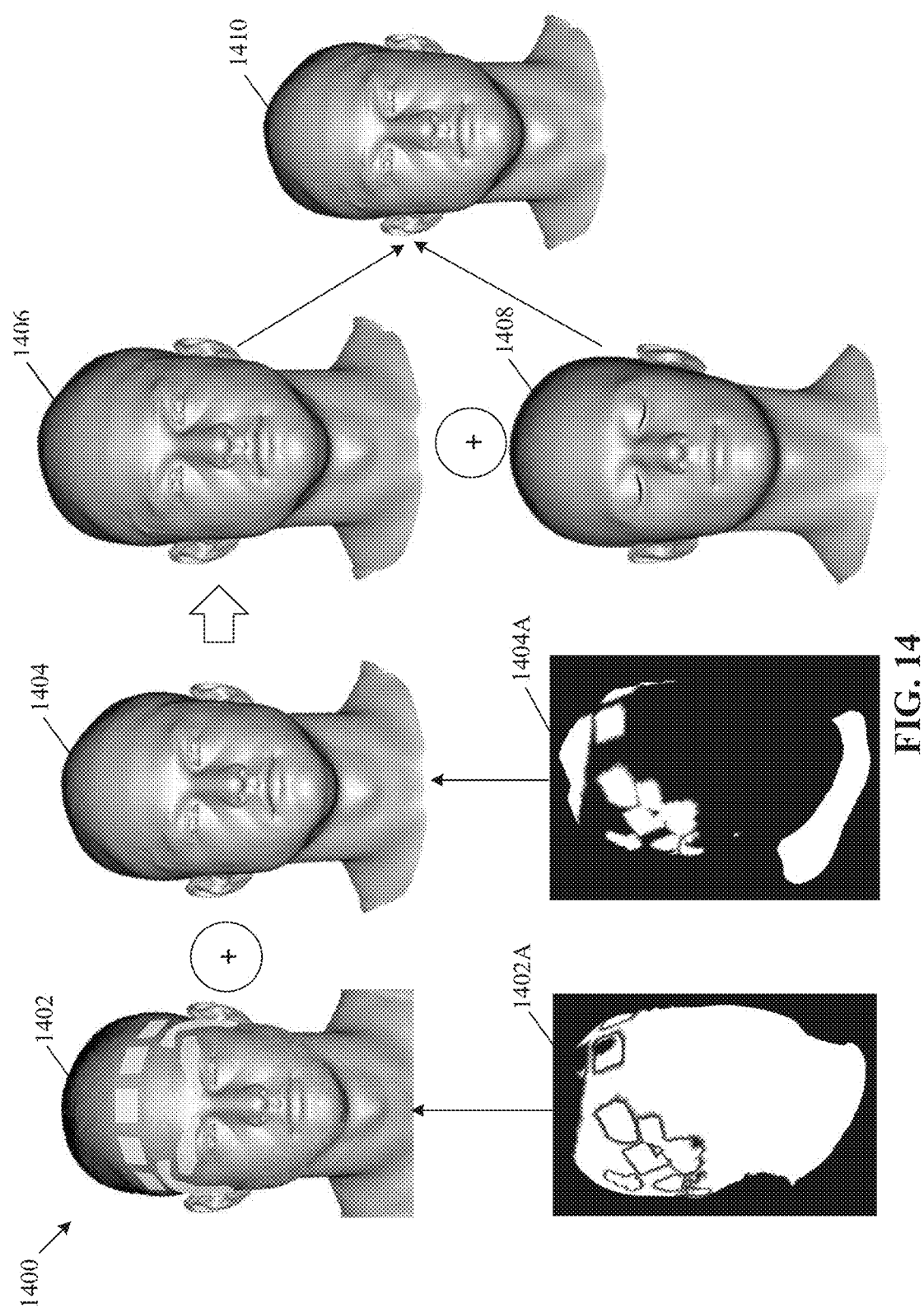
FIG. 14 is a diagram that illustrates a hole filling operation including an alpha-blending operation and a pyramid-blending operation, in accordance with an embodiment of the disclosure.

The hole filling operation may further include an alpha-blending operation and a pyramid-blending operation, as described further, for example, in FIG. 14. It should be noted that the diagram 1300 is for exemplary purpose and should not be construed as limiting the present disclosure.

FIG. 14 is a diagram that illustrates a hole filling operation including an alpha-blending operation and a pyramid-blending operation, in accordance with an embodiment of the disclosure. FIG. 14 is described in conjunction with elements from FIGS. 1, 2, 3, 4, 5A, 5B, 5C, 6A, 6B, 6C, 7A, 7B, 8A, 8B, 8C, 9A 9B, 10A, 10B, 11A, 11B, 12A, 12B, 12C, and 13. With reference to FIG. 14, there is shown a diagram 1400. The diagram 1400 may include a second 3D mesh 1402, a re-topologized 3D mesh 1404, an alpha-blended 3D mesh 1406, a 3D template mesh 1408, and a pyramid-blended 3D mesh 1410. The diagram 1400 may further include a set of non-hole regions 1402A of the second 3D mesh 1402 and a set of hole regions 1404A of the re-topologized 3D mesh 1404.

In an embodiment, the execution of the hole filling operation may include an alpha-blending operation on the re-topologized 3D mesh 1404 and the second 3D mesh 1402 to obtain the alpha-blended 3D mesh 1406. For example, to fill the set of holes of the second 3D mesh 1402, the set of hole regions 1404A of the re-topologized 3D mesh 1404 may be combined with the set of non-hole regions of the second 3D mesh 1402. The alpha-blending operation may be applied between the re-topologized 3D mesh 1404 and the second 3D mesh 1402 along a boundary of the set of non-hole regions 1402A, as the two meshes may have a same topology over the set of non-hole regions 1402A.

In an embodiment, the execution of the hole filling operation may further include a pyramid-blending operation on the alpha-blended 3D mesh 1406 and the 3D template mesh 1408 to obtain the pyramid-blended 3D mesh 1410. The pyramid-blending operation may be executed to improve a shape estimation for the set of hole regions 1404A. As the 3D template mesh 1408 may have the same topology as the updated template mesh 916, the 3D template mesh 1408 may be mapped to the same topology as that of the re-topologized 3D mesh 1404. The pyramid-blending operation may be a blending operation that may be executed over a pyramid co-ordinates system instead of a 3D co-ordinate system. The pyramid co-ordinates may be used as they may be efficient to represent a shape around a boundary of a region of a mesh. By way of example, and not limitation, the pyramid-blending operation may be a pyramid co-ordinate based blending operation, as described in, Sheffer, Alla, and Vladislav Kraevoy, "Pyramid coordinates for morphing and deformation.", Proceedings. 2nd International Symposium on 3D Data Processing, Visualization and Transmission, 2004 (3DPVT 2004).

For example, consider a projection P, a set of angles $\alpha_i$ between the projected edges, a set of angles $\beta_i$ between the normal and the edges, and a set of projected edge lengths $l_1$, For a blend function B defined over the mesh vertices (e.g., $v_i$) and applied on the pyramid co-ordinates, the pyramid-blending operation may be executed by use equations (4), (5), and (6), as follows:

$$\alpha_i = \alpha_i^S(1-B(v_i)) + \alpha_i^T B(v_i) \quad (4)$$

$$\beta_i = \beta_i^S(1-B(v_i)) + \beta_i^T B(v_i) \quad (5)$$

$$l_i = l_i^S(1-B(v_i)) + l_i^T B(v_i) \quad (6)$$

Where,
$\alpha_i^S$ and $\alpha_i^T$ may represent pyramid-blending weights associated with the set of angles $\alpha_i$;

$\beta_i^S$ and $\beta_i^T$ may represent pyramid-blending weights associated with the set of angles $\beta_i$; and
$l_i^S$ and $l_i^T$ may represent pyramid-blending weights associated with the set of projected edge lengths $l_i$.

A 3D mesh may be recovered based on the pyramid co-ordinates obtained after the pyramid blending operation executed using the equations 4, 5, and 6, for example. In an embodiment, the circuitry 202 may be further configured to execute a remeshing operation on the pyramid-blended 3D mesh 1410 (or the 3D mesh recovered from the pyramid-blended 3D mesh 1410) to generate the final 3D mesh. The remeshing operation to generate the final 3D mesh is described further, for example, in FIG. 15. It should be noted that the diagram 1400 is for exemplary purpose and should not be construed as limiting the present disclosure.

Figure 15:
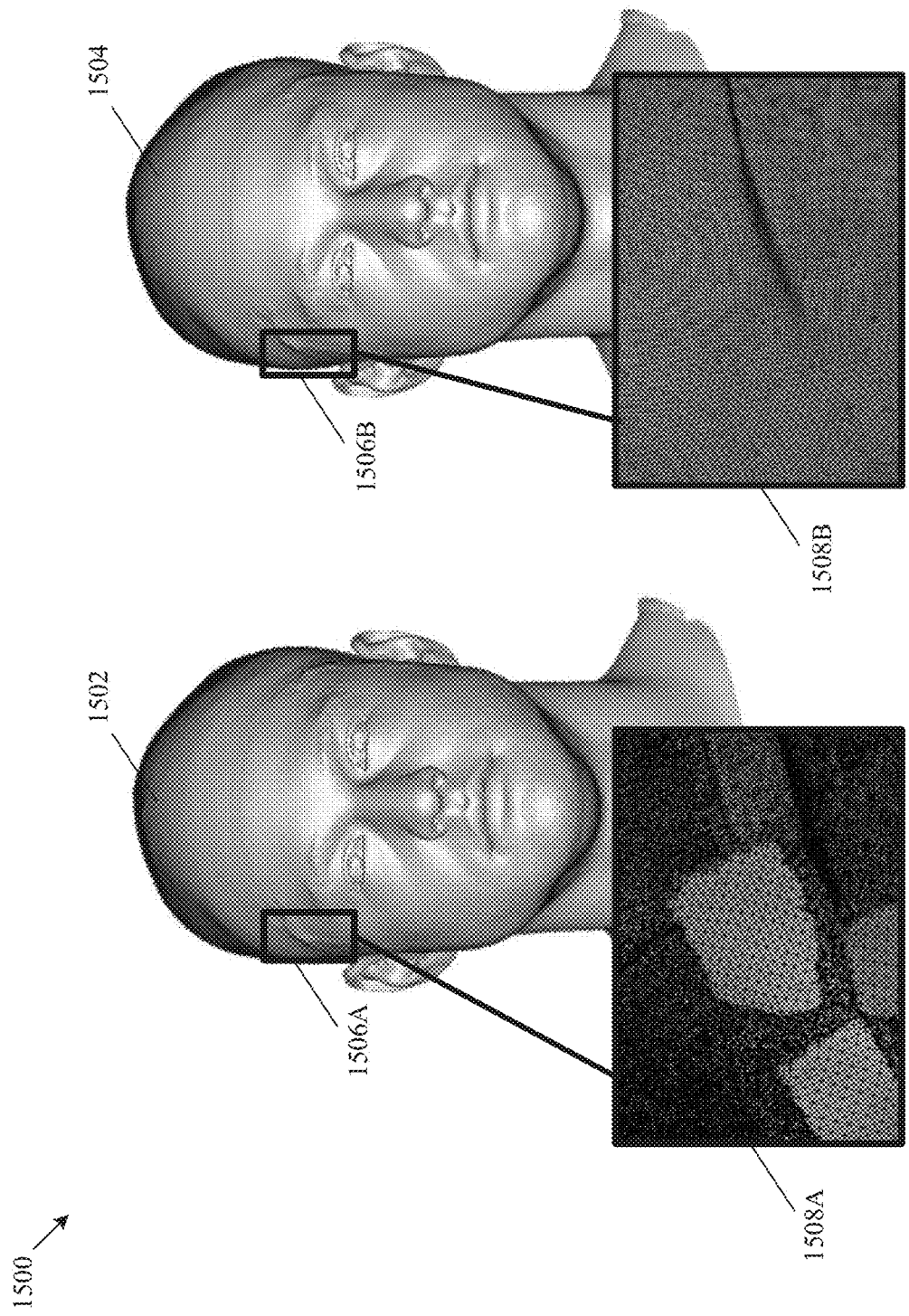
FIG. 15 is a diagram that illustrates a remeshing operation on a pyramid-blended 3D mesh to generate a final 3D mesh, in accordance with an embodiment of the disclosure.

FIG. 15 is a diagram that illustrates a remeshing operation on a pyramid-blended 3D mesh to generate a final 3D mesh, in accordance with an embodiment of the disclosure. FIG. 15 is described in conjunction with elements from FIGS. 1, 2, 3, 4, 5A, 5B, 5C, 6A, 6B, 6C, 7A, 7B, 8A, 8B, 8C, 9A 9B, 10A, 10B, 11A, 11B, 12A, 12B, 12C, 13, and 14. With reference to FIG. 15, there is shown a diagram 1500. The diagram 1500 may include a pyramid-blended 3D mesh 1502 and a final 3D mesh 1504. The diagram 1500 may further include a first region 1506A of the pyramid-blended 3D mesh 1502 and a second region 1506B of the final 3D mesh 1504. The second region 1506B may correspond to the first region 1506A. The diagram 1500 may further include a first expanded view 1508A of the first region 1506A and a second expanded view 1508B of the second region 1506B. The second expanded view 1508B may correspond to the first expanded view 1508A.

The circuitry 202 may be configured to execute a remeshing operation on the pyramid-blended 3D mesh 1502 to generate the final 3D mesh 1504. For example, the second region 1506B may be obtained from the first region 1506A based on an execution of a remeshing operation on the pyramid-blended 3D mesh 502. In an embodiment, the remeshing operation may re-mesh the pyramid-blended 3D mesh 1502 to a quad-dominant mesh associated with the final 3D mesh 1504. This may be because the quad-dominant mesh may be easy for further operations, such as, but not limited to, texture estimation and dynamic face modeling. In an example, the remeshing operation may be executed by use of an instant field-aligned meshing technique. By way of example, and not limitation, the instant field-aligned meshing technique may be a remeshing technique, as described in, Jakob, Wenzel, et al., "Instant field-aligned meshes.", ACM Transactions on Graphics, 2015. It should be noted that the diagram 1500 is for exemplary purpose and should not be construed as limiting the present disclosure.

Figure 16:
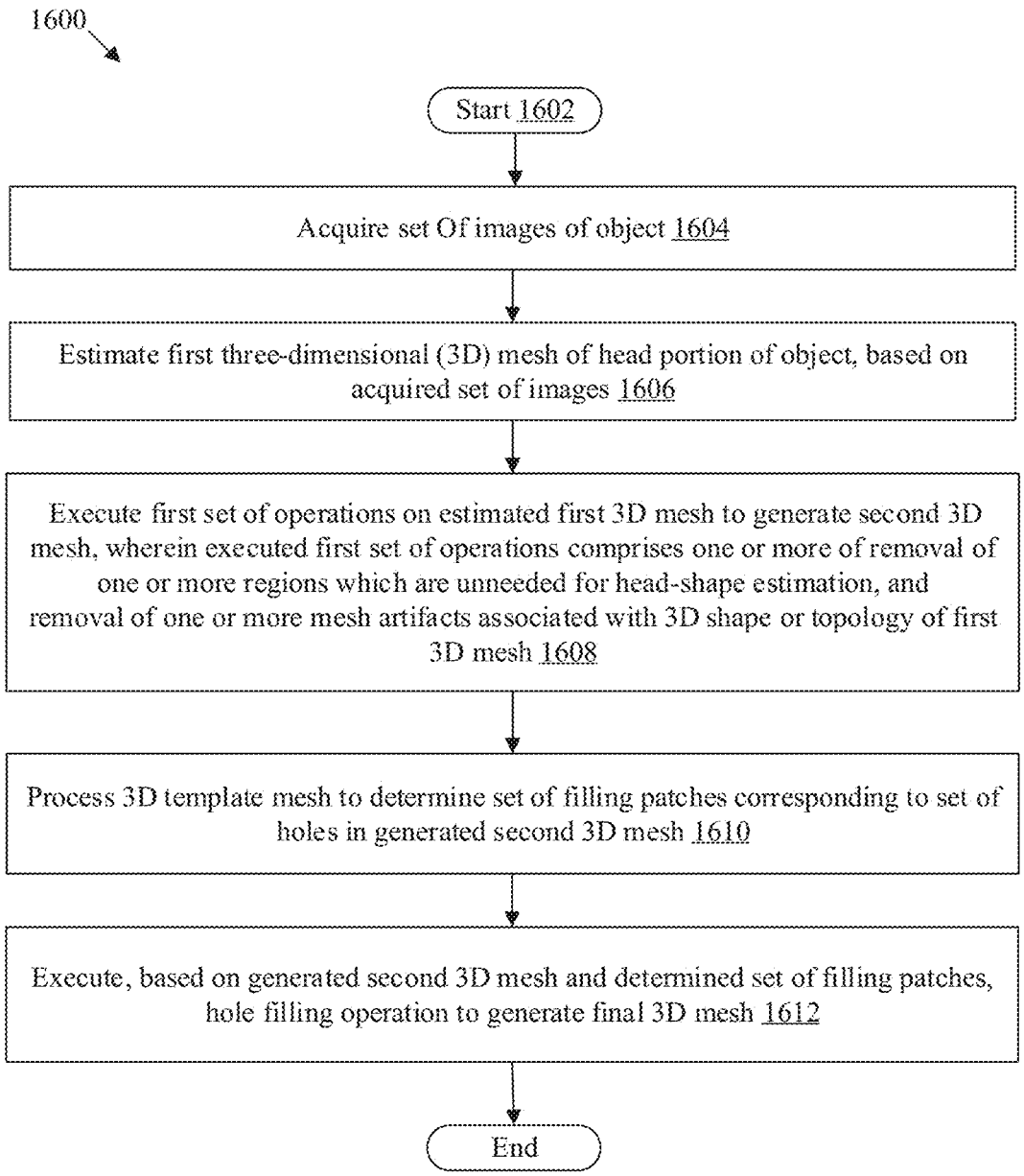
FIG. 16 is a flowchart that illustrates exemplary operations for shape refinement of a three-dimensional (3D) mesh reconstructed from images, in accordance with an embodiment of the disclosure.

FIG. 16 is a flowchart that illustrates exemplary operations for shape refinement of a three-dimensional (3D) mesh reconstructed from images, in accordance with an embodiment of the disclosure. FIG. 16 is described in conjunction with elements from FIGS. 1, 2, 3, 4, 5A, 5B, 5C, 6A, 6B, 6C, 7A, 7B, 8A, 8B, 8C, 9A 9B, 10A, 10B, 11A, 11B, 12A, 12B, 12C, 13, 14, and 15. With reference to FIG. 16, there is shown a flowchart 1600. The flowchart 1600 may include operations from 1604 to 1612 and may be implemented on the electronic device 102. The flowchart 1600 may start at 1602 and proceed to 1604.

At 1604, the set of images of the object 110 may be acquired. In an embodiment, the circuitry 202 of the electronic device 102 may be configured to acquire the set of images (e.g., the set of images 312A, 312B, and 312C) of the object 110. The set of images (e.g., the set of images 312A, 312B, and 312C) may be captured from the set of viewpoints (e.g., the viewpoints 116A, 116B, and 116C) by the set of image sensors 106. For example, the set of image sensors 106 may include the first group of image sensors 106A at the first vertical level 114A surrounding the object 110. The set of image sensors 106 may further include the second group of image sensors 1068 at the second vertical level 1148 surrounding the object 110. The first group of image sensors 106A may capture a first group of images of the object 110 from a first group of viewpoints at the first vertical level 114A, simultaneously. Similarly, the second group of image sensors 106B may capture a second group of images of the object 110 from a second group of viewpoints at the second vertical level 114B, simultaneously. In an embodiment, the object 110 may be stationary while the first group of images and/or the second group of images may be captured. In another embodiment, the object 110 may move in the 3D space along one or more of the X, Y, or Z axes, while the first group of images and/or the second group of images may be captured. The set of images may include the first group of images and the second group of images. Further, the set of viewpoints may include at least the first group of viewpoints and/or the second group of viewpoints. The set of image sensors 106 may be configured to transmit the set of images (e.g., the first image 312A, the second image 312B, and the third image 312C) of the object 110 to the electronic device 102, via the communication network 108. Alternatively, the circuitry 202 may acquire the set of images (e.g., the first image 312A, the second image 312B, and the third image 312C) from the set of image sensors 106. For example, in a scenario where the set of image sensors 106 is implemented as a component of the electronic device 102, the circuitry 202 may acquire the set of images (e.g., the first image 312A, the second image 312B, and the third image 312C) from the set of image sensors 106.

At 1606, the first 3D mesh 314 of the head portion of the object 110 may be estimated, based on the acquired set of images. In an embodiment, the circuitry 202 may be configured to estimate the first 3D mesh 314 of the head portion of the object 110 based on the acquired set of images. In an embodiment, the circuitry 202 may use the photogrammetric reconstruction method to estimate the first 3D mesh 314. In an example, the photogrammetric reconstruction method may include operations, such as, but not limited to, a feature detection and matching operation, a sparse reconstruction operation, a multi-view stereo operation, and a fusion and meshing operation. The estimation of the first 3D mesh 314 is described further, for example, in FIG. 3.

At 1608, the first set of operations may be executed on the estimated first 3D mesh 314 to generate the second 3D mesh 316. Herein, the executed first set of operations may include one or more of a removal of the one or more regions which may be unneeded for head-shape estimation, and a removal of the one or more mesh artifacts associated with a 3D shape or topology of first 3D mesh 314. The circuitry 202 may be configured to execute the first set of operations on the estimated first 3D mesh 314 to generate the second 3D mesh 316. The execution of the first set of operations is described further, for example, in FIGS. 3, 4, 5A, 5B, 5C, 6A, 6B, and 6C.

At 1610, the 3D template mesh 322 may be processed to determine the set of filling patches 324 corresponding to the set of holes in the generated second 3D mesh 316. In an embodiment, the circuitry 202 may be configured to process the 3D template mesh 322 to determine the set of filling patches 324 corresponding to the set of holes in the generated second 3D mesh 316. The 3D template mesh 322 may be processed by execution of a first operation and a second operation. The first operation may be to warp, for a non-hole region of the second 3D mesh 316, the 3D template mesh 322 based on a shape of the second 3D mesh 316 to obtain the warped template mesh. The second operation may be to update the warped template mesh with a first boundary corresponding to the warpage of the non-hole region. The 3D template mesh 322 may be further processed to execute a mesh retopology operation that may include a projection of the second 3D mesh 316 to the updated template mesh. The mesh retopology operation may further include a determination, from the updated template mesh, of a set of triangles associated with a first set of vertices at the first boundary corresponding to the warpage of the non-hole region. The mesh retopology operation may further include a determination a set of candidate vertices associated with the determined set of triangles based on the second 3D mesh 316. The mesh retopology operation may further include a connection of the determined set of candidate vertices to obtain a second boundary of a first filling patch of the set of filling patches 324. Further, the mesh topology operation may include a determination of the first filling patch based on the obtained second boundary. The first operation and the second operation are further described, for example, in FIGS. 9A and 9B. The mesh retopology operation is further described, for example, in FIGS. 10A and 10B.

At 1612, based on the generated second 3D mesh 316 and determined set of filling patches 324, a hole filling operation may be executed to generate the final 3D mesh 326. In an embodiment, the circuitry 202 may be configured to execute the hole filling operation may be executed to generate the final 3D mesh 326, based on the generated second 3D mesh 316 and determined set of filling patches 324. The circuitry 202 may be further configured to execute a remeshing operation on a pyramid-blended 3D mesh to generate the final 3D mesh 326. The execution of the hole filling operation is described further, for example, in FIGS. 3, 11A, 11B, 12A, 12B, 12C, 13, and 14. The execution of the remeshing operation is described further, for example, in FIG. 15. Control may pass to the end.

Although the flowchart 1600 is illustrated as discrete operations, such as 1604, 1606, 1608, 1610, and 1612, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate an electronic device (for example, the electronic device 102). The instructions may cause the electronic device 102 to perform operations that include acquiring a set of images (e.g., the images 312A, 312B, and 312C) of an object (e.g., the object 110). The operations may further include estimating a first three-dimensional (3D) mesh (e.g., the first 3D mesh 314) of a head portion of the object 110, based on the acquired set of images. The operations may further include executing a first set of operations on the estimated first 3D mesh 314 to generate a second 3D mesh (e.g., the second 3D mesh 316). The executed first set of operations may include one or more of a removal of one or more regions which are unneeded for head-shape estimation, and a removal of one or more mesh artifacts associated with a 3D shape or a topology of the first 3D mesh 314. The operations may further include processing a 3D template mesh (e.g., the 3D template mesh 322) to determine a set of filling patches (e.g., the set of filling patches 324) corresponding to a set of holes in the generated second 3D mesh 316. The operations may further include executing, based on the generated second 3D mesh 316 and the determined set of filling patches 324, a hole filling operation to generate a final 3D mesh 326.

Exemplary aspects of the disclosure may provide an electronic device (such as, the electronic device 102 of FIG. 1) that includes circuitry (such as, the circuitry 202). The circuitry 202 may be configured to acquire a set of images (e.g., the images 312A, 312B, and 312C) of an object (e.g., the object 110). The circuitry 202 may be further configured to estimate a first three-dimensional (3D) mesh (e.g., the first 3D mesh 314) of a head portion of the object 110, based on the acquired set of images. The circuitry 202 may be further configured to execute a first set of operations on the estimated first 3D mesh 314 to generate a second 3D mesh 316. The executed first set of operations may include one or more of a removal of one or more regions which are unneeded for head-shape estimation, and a removal of one or more mesh artifacts associated with a 3D shape or a topology of the first 3D mesh 314. The circuitry 202 may be further configured to process a 3D template mesh (e.g., the 3D template mesh 322) to determine a set of filling patches (e.g., the set of filling patches 324) corresponding to a set of holes in the generated second 3D mesh 316. The circuitry 202 may be further configured to execute, based on the generated second 3D mesh 316 and the determined set of filling patches 324, a hole filling operation to generate a final 3D mesh (e.g., the final 3D mesh 326).

In an embodiment, the one or more regions which may be unneeded for the head-shape estimation include at least one of coded target meshes or hair meshes. Further, the one or more mesh artifacts associated with the 3D shape or the topology may include a first mesh artifact in which one or more facets of the first 3D mesh include edges which are longer than a threshold.

In an embodiment, the circuitry 202 may be further configured to determine a dihedral angle between a pair of adjoining edges of the first 3D mesh 314. The circuitry 202 may be further configured to determine the pair of adjoining edges as a second mesh artifact of the one or more mesh artifacts, based on whether the determined dihedral angle is above a threshold. In an embodiment, the removal of the second mesh artifact may include at least one of a removal of the determined pair of edges or a relaxation of the determined pair of edges using a Laplacian smoothening operation.

In an embodiment, the circuitry 202 may be further configured to refine a boundary associated with each of the set of holes in the generated second 3D mesh 316 based on execution of an erosion operation over the boundary associated with each of the set of holes. In an embodiment, the circuitry 202 may be further configured to classify the set of holes in the generated second 3D mesh 316 into one or more first holes and one or more second holes. A number of vertices in a boundary of the one or more first holes may be below a threshold and a number of vertices in a boundary of the one or more second holes may be above a threshold. In an embodiment, the circuitry 202 may be further configured to fill the one or more first holes in the generated second 3D mesh 316 based on a shape of a boundary associated with each of the one or more first holes.

In an embodiment, the processing of the 3D template mesh 322 may include an execution of a first operation to warp, for a non-hole region of the second 3D mesh 316, the 3D template mesh 322 based on a shape of the second 3D mesh 316 to obtain a warped template mesh. The processing of the 3D template mesh 322 may further include a second operation to update the warped template mesh with a first boundary corresponding to the warpage of the non-hole region. The processing of the 3D template mesh 322 may further include an execution of a mesh retopology operation. The mesh retopology operation may include a projection of the second 3D mesh 316 to the updated template mesh (e.g., the updated template mesh 916) to obtain a projected 3D mesh (e.g., the projected 3D mesh 918). The mesh retopology operation may further include a determination, from the updated template mesh 916, of a set of triangles associated with a first set of vertices at the first boundary corresponding to the warpage of the non-hole region. The mesh retopology operation may further include a determination of a set of candidate vertices associated with the determined set of triangles based on the second 3D mesh 316. The mesh retopology operation may further include a connection of the determined set of candidate vertices to obtain a second boundary of a first filling patch of the set of filling patches 324. The mesh retopology operation may further include a determination of the first filling patch based on the obtained second boundary.

In an embodiment, the execution of the hole filling operation may include a combination of the set of filling patches 324 with the projected 3D mesh 918 to obtain a connected mesh. The hole filling operation may further include a filling-up of gaps between connecting parts of the connected mesh to obtain a re-topologized 3D mesh (e.g., the re-topologized 3D mesh 1106).

In an embodiment, the circuitry 202 may be further configured to determine a set of adjacent boundary intervals based on the projected 3D mesh 918 and the set of filling patches 324 included in the connected mesh. The circuitry 202 may be further configured to connect the determined set of adjacent boundary intervals in a pairwise manner to fill-up the gaps with triangles.

In an embodiment, the execution of the hole filling operation may further include an alpha-blending operation on the re-topologized 3D mesh (e.g., the re-topologized 3D mesh 1404) and the second 3D mesh (e.g., the second 3D mesh 1402) to obtain an alpha-blended 3D mesh (e.g., the alpha-blended 3D mesh 1406). The execution of the hole filling operation may further include a pyramid-blending operation on the alpha-blended 3D mesh 1406 and the 3D template mesh (e.g., the 3D template mesh 1408) to obtain a pyramid-blended 3D mesh (e.g., the pyramid-blended 3D mesh 1410).

In an embodiment, the circuitry 202 may be further configured to execute a remeshing operation on the pyramid-blended 3D mesh (e.g., the pyramid-blended 3D mesh 1502) to generate the final 3D mesh (e.g., the final 3D mesh 1504).

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein.

The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
circuitry configured to:
acquire a set of images of an object;
estimate a first three-dimensional (3D) mesh of a head portion of the object, based on the acquired set of images;
execute a first set of operations on the estimated first 3D mesh to generate a second 3D mesh, wherein the executed first set of operations comprises one or more of:
a removal of one or more regions which are unneeded for head-shape estimation, and
a removal of one or more mesh artifacts associated with a 3D shape or a topology of the first 3D mesh;
acquire a 3D template mesh;
process the 3D template mesh to determine a set of filling patches corresponding to a set of holes in the generated second 3D mesh;
refine a boundary associated with each of the set of holes in the generated second 3D mesh, by execution of an erosion operation over the boundary associated with each of the set of holes; and
execute, based on the generated second 3D mesh, the refinement of the boundary, and the determined set of filling patches, a hole filling operation to generate a final 3D mesh.

2. The electronic device according to claim 1, wherein
the one or more regions which are unneeded for the head-shape estimation include at least one of coded target meshes or hair meshes, and
the one or more mesh artifacts associated with the 3D shape or the topology include a first mesh artifact in which one or more facets of the first 3D mesh include edges which are longer than a threshold.

3. The electronic device according to claim 1, wherein the circuitry is further configured to:
determine a dihedral angle between a pair of adjoining edges of the first 3D mesh; and
determine the pair of adjoining edges as a second mesh artifact of the one or more mesh artifacts, based on the determined dihedral angle that is above a threshold.

4. The electronic device according to claim 3, wherein the removal of the second mesh artifact comprises at least one of a removal of the determined pair of adjoining edges or a relaxation of the determined pair of adjoining edges using a Laplacian smoothening operation.

5. The electronic device according to claim 1, wherein
the circuitry is further configured to classify the set of holes in the generated second 3D mesh into one or more first holes and one or more second holes,
a number of vertices in a boundary of the one or more first holes is below a threshold, and
a number of vertices in a boundary of the one or more second holes is above the threshold.

6. The electronic device according to claim 5, wherein the circuitry is further configured to fill the one or more first holes in the generated second 3D mesh based on a shape of the boundary associated with each of the one or more first holes.

7. The electronic device according to claim 5, wherein the processing of the 3D template mesh comprises execution of:
a first operation to warp, for a non-hole region of the second 3D mesh, the 3D template mesh based on a shape of the second 3D mesh to obtain a warped template mesh, and
a second operation to update the warped template mesh with a first boundary corresponding to the warpage of the non-hole region.

8. The electronic device according to claim 7, wherein the processing of the 3D template mesh further comprises execution of a mesh retopology operation to:
project the second 3D mesh to the updated template mesh to obtain a projected 3D mesh;
determine, from the updated template mesh, a set of triangles associated with a first set of vertices at the first boundary corresponding to the warpage of the non-hole region;
determine a set of candidate vertices associated with the determined set of triangles based on the second 3D mesh;
connect the determined set of candidate vertices to obtain a second boundary of a first filling patch of the set of filling patches; and
determine the first filling patch based on the obtained second boundary.

9. The electronic device according to claim 8, wherein the execution of the hole filling operation comprises:
a combination of the set of filling patches with the projected 3D mesh to obtain a connected mesh; and
a filling-up of gaps between connecting parts of the connected mesh to obtain a re-topologized 3D mesh.

10. The electronic device according to claim 9, wherein the circuitry is further configured to:
determine a set of adjacent boundary intervals based on the projected 3D mesh and the set of filling patches included in the connected mesh; and
connect the determined set of adjacent boundary intervals in a pairwise manner to fill-up the gaps with triangles.

11. The electronic device according to claim 9, wherein the execution of the hole filling operation further comprises:
an alpha-blending operation on the re-topologized 3D mesh and the second 3D mesh to obtain an alpha-blended 3D mesh; and
a pyramid-blending operation on the alpha-blended 3D mesh and the 3D template mesh to obtain a pyramid-blended 3D mesh.

12. The electronic device according to claim 11, wherein the circuitry is further configured to execute a remeshing operation on the pyramid-blended 3D mesh to generate the final 3D mesh.

13. A method, comprising:
acquiring a set of images of an object;
estimating a first three-dimensional (3D) mesh of a head portion of the object, based on the acquired set of images;
executing a first set of operations on the estimated first 3D mesh to generate a second 3D mesh, wherein the executed first set of operations comprises one or more of:
a removal of one or more regions which are unneeded for head-shape estimation, and
a removal of one or more mesh artifacts associated with a 3D shape or a topology of the first 3D mesh;
acquiring a 3D template mesh;
processing the 3D template mesh to determine a set of filling patches corresponding to a set of holes in the generated second 3D mesh;
refining a boundary associated with each of the set of holes in the generated second 3D mesh by executing an erosion operation over the boundary associated with each of the set of holes; and
executing, based on the generated second 3D mesh, the refinement of the boundary, and the determined set of filling patches, a hole filling operation to generate a final 3D mesh.

14. The method according to claim 13, further comprising classifying the set of holes in the generated second 3D mesh into one or more first holes and one or more second holes, wherein
a number of vertices in a boundary of the one or more first holes is below a threshold, and
a number of vertices in a boundary of the one or more second holes is above the threshold.

15. The method according to claim 14, further comprising filling the one or more first holes in the generated second 3D mesh based on a shape of the boundary associated with each of the one or more first holes.

16. The method according to claim 14, wherein the processing of the 3D template mesh comprises execution of:
a first operation that comprises warping, for a non-hole region of the second 3D mesh, the 3D template mesh based on a shape of the second 3D mesh to obtain a warped template mesh, and
a second operation that comprises updating the warped template mesh with a first boundary corresponding to the warpage of the non-hole region.

17. The method according to claim 16, wherein the processing of the 3D template mesh further comprises execution of a mesh retopology operation that comprises:
projecting the second 3D mesh to the updated template mesh to obtain a projected 3D mesh;
determining, from the updated template mesh, a set of triangles associated with a first set of vertices at the first boundary corresponding to the warpage of the non-hole region;
determining a set of candidate vertices associated with the determined set of triangles based on the second 3D mesh;
connecting the determined set of candidate vertices to obtain a second boundary of a first filling patch of the set of filling patches; and
determining the first filling patch based on the obtained second boundary.

18. The method according to claim 17, wherein the execution of the hole filling operation comprises:

combining the set of filling patches with the projected 3D mesh to obtain a connected mesh; and filling-up gaps between connecting parts of the connected mesh to obtain a re-topologized 3D mesh.

19. A non-transitory computer-readable medium having stored thereon, computer-executable instructions that when executed by a processor in an electronic device, causes the electronic device to execute operations, the operations comprising:

acquiring a set of images of an object;

estimating a first three-dimensional (3D) mesh of a head portion of the object, based on the acquired set of images;

executing a first set of operations on the estimated first 3D mesh to generate a second 3D mesh, wherein the executed first set of operations comprises one or more of:

a removal of one or more regions which are unneeded for head-shape estimation, and a removal of one or more mesh artifacts associated with a 3D shape or a topology of the first 3D mesh;

acquiring a 3D template mesh;

processing the 3D template mesh to determine a set of filling patches corresponding to a set of holes in the generated second 3D mesh;

refining a boundary associated with each of the set of holes in the generated second 3D mesh by executing an erosion operation over the boundary associated with each of the set of holes; and executing, based on the generated second 3D mesh, the refinement of the boundary, and the determined set of filling patches, a hole filling operation to generate a final 3D mesh.

20. An electronic device, comprising:

circuitry configured to:

acquire a set of images of an object;

estimate a first three-dimensional (3D) mesh of a head portion of the object, based on the acquired set of images;

execute a first set of operations on the estimated first 3D mesh to generate a second 3D mesh, wherein the executed first set of operations comprises one or more of:

a removal of one or more regions which are unneeded for head-shape estimation, wherein the one or more regions include at least one of coded target meshes or hair meshes, and a removal of one or more mesh artifacts associated with a 3D shape or a topology of the first 3D mesh, wherein the one or more mesh artifacts include a first mesh artifact in which one or more facets of the first 3D mesh include edges which are longer than a threshold;

acquire a 3D template mesh;

process the 3D template mesh to determine a set of filling patches corresponding to a set of holes in the generated second 3D mesh; and execute, based on the generated second 3D mesh and the determined set of filling patches, a hole filling operation to generate a final 3D mesh.

\* \* \* \* \*